US006064997A

United States Patent [19]
Jagannathan et al.

[11] Patent Number: 6,064,997
[45] Date of Patent: May 16, 2000

[54] DISCRETE-TIME TUNING OF NEURAL NETWORK CONTROLLERS FOR NONLINEAR DYNAMICAL SYSTEMS

[75] Inventors: Sarangapani Jagannathan, Peoria, Ill.; Frank Lewis, Bedford, Tex.

[73] Assignee: University of Texas System, The Board of Regents, Austin, Tex.

[21] Appl. No.: 08/821,673

[22] Filed: Mar. 19, 1997

Related U.S. Application Data

[60] Provisional application No. 60/013,678, Mar. 19, 1996.

[51] Int. Cl.[7] .................................................. G06F 15/18
[52] U.S. Cl. .............................. 706/23; 706/22; 706/31; 706/39; 706/103; 706/106; 364/148.03
[58] Field of Search .................................. 706/22, 23, 31, 706/39, 903, 906; 364/148.03

[56] References Cited

U.S. PATENT DOCUMENTS

| | | | |
|---|---|---|---|
| 5,119,468 | 6/1992 | Owens | 706/906 |
| 5,121,467 | 6/1992 | Skeirik | 706/906 |
| 5,159,660 | 10/1992 | Lu et al. | 706/906 |
| 5,471,381 | 11/1995 | Khan | 706/906 |
| 5,513,098 | 4/1996 | Spall et al. | 706/906 |
| 5,566,065 | 10/1996 | Hansen et al. | 706/906 |

OTHER PUBLICATIONS

Jagannathan et al, "Identification of a Class of Nonlinear Dynamical Systems Using Multilayer Neural Networks", 1994 IEEE International Symposium on Intelligent Control, Aug. 1994.

Jagannathan et al, "Multilayer Neural Network Controller for a class of Nonlinear Systems", Proceeding of the International Symposium on Control, IEEE, Aug. 1995.

Vidyasagar, M. "Nonlinear Systems Analysis," Prentice Hall, Inc. Englewood, New Jersey, 1993.

F. Chen, H.K. Khalil, "Adaptive control of nonlinear systems using neural networks," *Int. J. Control*, 55(6):1299–1317, 1992.

G.C. Goodwin, K.S. Sin, "Adaptive Filtering, Prediction and Control," Prentice–Hall Inc., Englewood Cliffs, NJ, 1984.

S. Jagannathan, F.L. Lewis, "Multilayer Discrete–time neural net controller with guaranteed performance," *IEEE Transaction on Neural Networks* 7(1):107–130, Jan. 1996.

I.D. Landau, "Evolution of adaptive control," *ASME Journal of Dynamic Systems, Measurements, and Control*, 115:381–391, Jun. 1993.

I.D. Landau, "Adaptive Control: The Model Reference Approach," Marcel Dekker, Inc., 1979.

A.U. Levine, K.S. Narendra, "Control of nonlinear dynamical systems using neural networks: Controllability and stabilization," *IEEE Trans. Neural Networks*, 4(2), Mar. 1993.

F.L. Lewis, K. Liu, A. Yesildirek, "Multilayer Neural net robot controller with guaranteed tracking performance," *IEEE. Trans. on Neural Networks*, Mar. 1996.

(List continued on next page.)

*Primary Examiner*—Tariq R. Hafiz
*Assistant Examiner*—Michael Pender
*Attorney, Agent, or Firm*—Fulbright & Jaworski

[57] ABSTRACT

A family of novel multi-layer discrete-time neural net controllers is presented for the control of an multi-input multi-output (MIMO) dynamical system. No learning phase is needed. The structure of the neural net (NN) controller is derived using a filtered error/passivity approach. For guaranteed stability, the upper bound on the constant learning rate parameter for the delta rule employed in standard back propagation is shown to decrease with the number of hidden-layer neurons so that learning must slow down. This major drawback is shown to be easily overcome by using a projection algorithm in each layer. The notion of persistency of excitation for multilayer NN is defined and explored. New on-line improved tuning algorithms for discrete-time systems are derived, which are similar to e-modification for the case of continuous-time systems, that include a modification to the learning rate parameter plus a correction term. These algorithms guarantee tracking as well as bounded NN weights. An extension of these novel weight tuning updates to NN with an arbitrary number of hidden layers is discussed. The notions of discrete-time passive NN, dissipative NN, and robust NN are introduced.

6 Claims, 9 Drawing Sheets-

OTHER PUBLICATIONS

K.S. Narendra, A.M. Annaswamy, "A new adaptive law for robust adaptation without persistent adaptation," *IEEE Trans. Automatic Control*, AC–32(2):134–145, Feb. 1987.

K.S. Narendra, K. Parthasarathy, "Identification and control of dynamical systems using neural networks," *IEEE Trans. Neural Networks*, 1:4–27, Mar. 1990.

R. Ortega, L. Praly, I.D. Landau, "Robustness of discrete–time direct adaptive controllers," *IEEE Trans. Automatic Control*, AC–30(12):1179–1187, Dec. 1985.

Sadegh, N., "A Perceptron Network for Functional Identification and Control of Nonlinear Systems," IEEE Transactions on Neural Networks, 4(6):982–988, 1993.

Sanner et al., "Gaussian Networks for Direct Adaptive Control," IEEE Transactions on Neural Networks, 3(6):837–863, Nov. 1992.

R.M. Sanner, J.J.E. Slotine, "Stable adaptive control and recursive identification using radial gaussian networks," *Proc. IEEE Conf. Decision and Control*, Brighton, 1991.

H.J. Sira–Ramirez, S.H. Zak, "The adaptation of perceptrons with applications to inverse dynamics identification of unknown dynamic systems," *IEEE Trans. Systems, Man, and Cybernetics*, 21(3), May/Jun. 1991.

B. Widrow, M. Lehr, "30 Years of Adaptive Neural Networks: Perceptrons, Madaline, and Backpropagation," *Proceedings of the IEEE*, 78(9):1415–1442, Sep. 1990.

DISCRETE-TIME TUNING OF NEURAL NETWORK CONTROLLERS FOR NONLINEAR DYNAMICAL SYSTEMS

CLAIM OF PRIORITY

This application claims the benefit of U.S. Provisional application Ser. No. 60/013,678, by Frank Lewis and Sarangapani Jagannathan, filed Mar. 19, 1996.

1. BACKGROUND OF THE INVENTION

The following references, to the extent that they provide exemplary procedural or other details supplementary to those set forth herein, are specifically incorporated herein by reference. These references may provide certain background regarding the subject matter discussed herein.

F. Chen, H. K. Khalil, "Adaptive control of nonlinear systems using neural networks," Int. J. Control, 55(6):1299–1317, 1992.

G. C. Goodwin, K. S. Sin, "Adaptive Filtering, Prediction and Control," Prentice-Hall Inc., Englewood Cliffs, N.J., 1984.

S. Jagannathan, F. L. Lewis, "Discrete-time neural net controller with guaranteed performance," IEEE Transaction on Neural Networks, January 1996.

I. D. Landau, "Evolution of Adaptive control," ADME Journal of Dynamic systems, Measurements, and Control, 115:381–391, June 1993.

I. D. Landau, "Adaptive Control: The Model Reference Approach," Marcel Dekker, Inc., 1979.

A. U. Levine, K. S. Narendra, "Control of nonlinear dynamical systems using neural networks: Controllability and stabilization," IEEE Trans, Neural Network, 4(2), March 1993.

F. L. Lewis, K. Liu, A. Yesildirek, "Multilayer Neural net robot controller with guaranteed performance," IEEE. Trans. on Neural Networks, March 1996.

K. S. Narendra, A. M. Annaswamy, "A new adaptive law for robust adaptation without persistent adaptation," IEEE Trans. Automatic Control, AC-32(2):134–145, Feb. 1987.

K. S. Narendra, K. Parthasarathy, "Identification and control of dynamical systems using neural networks," IEEE Trans. Neural Networks, 1:4–27, March 1990.

R. Ortega, L. Praly, I. D. Landau, "Robustness of discrete-time direct adaptive controllers," IEEE Trans. Automatic Control, AC-30(12):1179–1187, Dec. 1985.

J. Park and I. W. Sandberg, "Universal approximation using radial-basis-function networks," Neural Computation, 3:246–257, 1991.

M. M. Polycarpou and P. A. Ioannu, "Identification and control using neural network models: design and stability analysis," Tech. Report 91-09-01, Dept. Elect. Eng. Sys., Univ. S. Cal., Sept. 1991.

D. E. Rumelhart, G. E. Hinton, R. J. Wiliams, "Learning internal representations by error propagation," readings in machine learning, Edited by J. W., Shavlik et al., Morgan Kaufman Publishers, Inc. 115–137, 1990.

N. Sadegh, "Nonlinear identification and control via neural networks," Control Systems with inexact Model, DSC-vol 33, ASME winter Annual Meeting, 1991.

R. M. Sanner, J. J. E. Slotine, "Stable adaptive control and recursive identification using radial gaussian networks," Proc. IEEE Conf. Decision and Control, Brighton, 1991.

H. J. Sira-Ramirez, S. H. Zak, "The adaptation of perceptrons with applications to inverse dynamics identification of unknown dynamic systems," IEEE Trans. Systems, Man, and Cybernetics, 21(3), May/June 1991.

J.-J. E. Slotine, W. Li, "Applied Nonlinear Control," Prentice-Hall Inc., Englewood Cliffs, N.J., 1991.

M. Tomizuka, "On the design of digital tracking controllers," ASME Journal o Dynamic Systems, Measurements, and Control, 115:412–418, June 1993.

M. Vidyasagar, "Nonlinear Systems Analysis," Prentice-Hall Inc., Englewood Cliffs, N.J., 1993. B. Widrow, J. Lehr, "30 Years Of Adaptive Neural Networks: Perceptrons, Madaline, And Backpropagation," Proceedings Of The IEEE, 78(9):1415–1442, Sept. 1990.

It has been a desire of scientists to develop control mechanisms so that machines could function independently without human intervention. Such controlled machines should be able to complete an unstructured task and learn from the feedback information about their performance. These machines, therefore, should be able to learn tasks not easily handled by existing machines, and more importantly, continue to adapt and perform these tasks with increasing efficacy under uncertainties.

In order to confront modern technological problems that require systems with intelligent functions such as simultaneous utilization of memory, learning, or high-level decision making in response to "fuzzy" or qualitative commands, intelligent controls is being investigated. Intelligent control should utilize cognitive theory effectively with various mathematical programming techniques. Learning is a first step toward intelligent control and would replace the human operator by making intelligent choices whenever the environment does not allow or justify the presence of a human operator. Learning has the capability of reducing the uncertainties affecting the performance of a dynamical system through on-line modeling (system identification), thereby improving the knowledge about the system so that it can be controlled more effectively.

Considerable research has been conducted in system identification (Narendra and Parthasarathy, 1990) or identification-based NN control (Levine and Narendra, 1993), and little about the use of direct closed-loop multilayer NN controllers that yield guaranteed performance (Chen and Khalil, 1992). On the other hand, some results presenting the relations between NN and direct adaptive control (Landau, 1993; Lewis et al., 1993), as well as some notions on NN for robot control, are given in (Sadegh, 1991; Sanner and Slotine, 1991). A direct continuous-time multilayer neural net robot controller was proposed in (Levine and Narendra, 1993) which guarantees closed-loop tracking performance. However, little about the application of discrete-time multilayer NN in direct closed-loop controllers that yield guaranteed performance is discussed in the literature.

The controller design with NN having multilayers for both continuous an d discrete-time is treated in (Chen and Khalil, 1992; Lewis et al., 1993; Sira-Ramirez and Zak, 1991). In (Chen and Khalil, 1992), the adaptive control of nonlinear systems using multilayer NN is presented very nicely. However, the performance of this controller is dependent upon the choice of the deadzone and the richness of the input signal. In addition, an explicit learning phase for the NN controller is needed initially. In (Sira-Ramirez and Zak, 1991), it is assumed that the input to the multilayer NN is considered to be fixed for successive iterations which is an unreasonable assumption for the controller design. Furthermore, in these papers (Chen and Khalil, 1992; Sira-Ramirez and Zak, 1991) passivity properties of the NN are not investigated. A three-layer NN controller design is presented in (Lewis et al., 1993) for the control of continuous-time systems. However, generalization of the stability analysis to NN having arbitrary number of hidden layers cannot be deduced due to the problem of defining and verifying the persistency of excitation condition for a multilayer NN. In addition, the weight tuning algorithms presented and the associated stability analysis discussed in (Lewis et al., 1993) is specific to robotic systems.

To confront all these issues head on in this invention, a family of novel learning schemes is investigated for a multilayer discrete-time NN whose weights are tuned on-line with no learning phase needed. The weight tuning mechanisms guarantee convergence of the NN weights when initialized at zero, even though there do not exist "ideal" weights such that the NN perfectly reconstructs a certain required function. The controller structure ensures good tracking performance, as shown through a Lyapunov's approach, so that the convergence to a stable solution is guaranteed. Finally, in contrast to adaptive control, it is not necessary to know a priori the structure of the plant; this structural information is instead inferred on-line by the NN.

The controller is composed of a neural net incorporated into a dynamical system, where the structure comes from filtered error notions standard in robot control literature. It is shown that the weight tuning algorithm using the standard backpropagation delta rule in each layer a passive neural net. This, if coupled with the dissipativity of the dynamical system, guarantees the boundedness of all the signals in the closed-loop system under a persistency of excitation (PE) condition disclosed below. However, PE is difficult to guarantee in a NN, which by design has redundant parameters for robust performance. Unfortunately, if PE does not hold, the delta rule generally does not guarantee tracking and bounded weights. Moreover, it is found here that the maximum permissible tuning rate for the developed tuning algorithm decreases as the NN size increases; this is a major drawback. A projection algorithm discussed herein is shown to easily correct the problem. Finally, new modified weight tuning algorithms introduced avoid the need for PE by making the NN robust, that is, state strict passive.

SUMMARY OF THE INVENTION

The present invention includes a method of on-line tuning of a multi-layer neural network used to control a plant, comprising the steps of defining a functional estimate from current values of a plurality of neural network weights and a plurality of layer activation functions; determining weight estimation errors to thereby tune the multi-layer neural network. In exemplary embodiments, the updating step may comprise the step of determining a modified functional estimation error and/or the step of determining a filtered tracking error.

The present invention also includes a method of on-line tuning of a multi-layer neural network used to control a plant, comprising the steps of defining a functional estimate from current values of a plurality of neural network weights and a plurality of layer activation functions; determining weight estimation errors for the plurality of neural network weights; updating the weight estimation errors to thereby tune the multi-layer neural network; and modifying the updated weight estimation errors, thereby obtaining a projection algorithm.

The present invention also includes a method for direct adaptive control of a nonlinear plant having an internal state x and a sensed state and an unknown function f(x), using a discrete-time neural network controller, comprising: calculating a functional estimate of the unknown function f(x) from current values of a plurality of neural network weights and a plurality of activation functions, the calculating being a function of the sensed state; comparing the sensed state with a desired trajectory in an outer feedback loop to produce a tracking error signal; calculating a control action as a function of the tracking error signal and the functional estimate; applying the control action to the plant to maintain the internal state at the desired trajectory; and adjusting the plurality of neural network weights such that the discrete-time neural network controller guarantees tracking stability and bounded weights. In an exemplary embodiment, the adjusting step may comprise: adjusting simultaneously on-line the plurality of neural network weights and the tracking error control; adjusting the plurality of neural network weights as a function of the tracking error signal by extending standard delta rule techniques, thereby providing guaranteed closed-loop stability without preliminary off-line training of the plurality of neural network weights. In another exemplary embodiment, the adjusting step may utilize a projection algorithm. The discrete-time neural network may have a passivity property, thereby guaranteeing robust performance of the discrete-time neural network controller.

2. DETAILED DESCRIPTION

Let R denote the real numbers, $R^n$ denote the real n-vectors, $R^{m \times n}$ the real m×n matrices. Let S be a compact simply-connected set of $R^n$. With maps $f: S \rightarrow R^k$, define $C^k(S)$ as the space such that f is continuous. We denote by $\|.\|$ any suitable vector norm. Given a matrix $A=[a_{ij}]$, $A \in R^{n \times m}$ the Frobenius norm is defined by $$\|A\|_F^2 = tr(A^T A) = \sum_{i,j} a_{ij}^2,$$

with tr ( ) the tract operation. The Frobenius norm $\|A\|_F$, denoted by $\|.\|$ throughout this application until unless specified explicitly, is nothing but the vector 2-norm over the space defined by stacking the matrix columns into a vector, so that it is compatible with the vector 2-norm, that is, $\|Ax\| \leq \|A\|.\|x\|$.

2.1 Neural Networks

Figure 1:
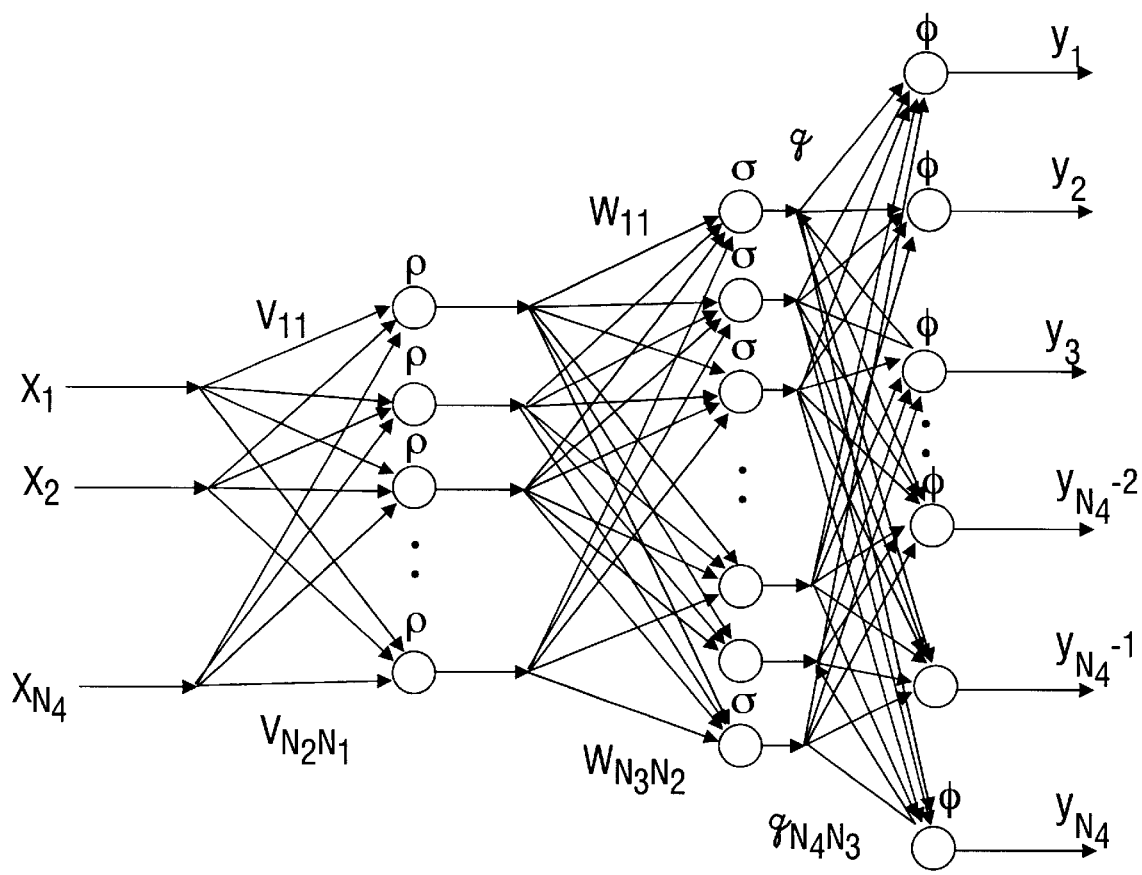
FIG. 1 is a block diagram of a three-layer neural network.

Given $x_k \in R$, a three-layer neural network as shown in FIG. 1 has a net output $$y_i = \sum_{n=1}^{N_3} \left[ q_{in}\varphi \left[ \sum_{j=1}^{N_2} \left[ w_{nj}\sigma \left[ \sum_{k=1}^{N_1} v_{jk}\rho(x_k) + \theta_{vj} \right] + \theta_{wn} \right] \right] + \theta_{qi} \right]; \quad (2.1)$$

$$i = 1, \ldots, N_4$$

with $\rho(.)$, $\sigma(.)$ and $\phi(.)$ the activation functions, $v_{jk}$ the input-layer interconnection weights, $w_{nj}$ the hidden-layer interconnection weights and $q_{in}$ the output-layer interconnection weights. The $\theta_{vm}$, $\theta_{wm}$, $\theta_{sm}$, m=1,2 . . . , are threshold offsets and the number of neurons in the input-layer is $N_1$, with $N_2$ the number of hidden-layer neurons and $N_3$ the number of output-layer neurons. The weights of the neural net are adapted on-line in order to achieve a desired performance.

The neural net equation may be conveniently expressed in matrix format by defining $x=[x_0, x_1 \ldots, x_{N1}]^T$, $y=[y_0, y_1, \ldots, y_{N3}]^T$, and weight matrices $Q^T=[q_{in}]$, $W^T=[w_{nj}]$, $V^T=[v_{jk}]$. Including $x_0\equiv 1$ in x allows one to include the threshold vector $[\theta_{v1}, \theta_{v2} \ldots, \theta_{vN1}]^T$ as the first column of $V^T$, so that $V^T$ contains both the weights and thresholds of the input-layer connections. Then, $$y = Q^T\phi(W^T \sigma(V^T\rho(x))), \quad (2.2)$$

with the vector of hidden-layer activation functions $\sigma(z)=[\sigma(z_1), \ldots, \sigma(z_a)]^T$ defined for a vector $z=[z_1, \ldots, z_a]^T$. Including a 1 as the first element in $\sigma(z)$ (i.e. placed above $\sigma(z_1)$), allows one to incorporate the thresholds $\theta_{wj}$ as the first column of $W^T$. Any tuning of S, W and V then includes tuning of the thresholds was well.

A general function $f(x) \in C^k(S)$ can be written, according to the Stone-Weirstrass Theorem [Park and Sandberg, 1991], as $$f(x) = Q^T W^T \sigma(V^T x) + \epsilon(k), \quad (2.3)$$

with $\epsilon(k)$ a neural net functional reconstruction error vector, and the input and output layer activation functions, $\rho(.)$ and $\phi(.)$, respectively considered to be linear. If there exists $N_2$ and constant ideal weights Q, W and V such that $\epsilon=0$ for all $x \in S$, then f(x) is said to be in the functional range of the neural net. In general, given a constant real number $\epsilon \geq 0$, f(x) is within $\epsilon_N$ of the neural net range if there exists $N_2$ and constant weights so that for all $x \in R^n$, equation (2.3) holds with $\|\epsilon\| \leq \epsilon_N$.

Different well-known results for various activation functions $\sigma(.)$, based on the Stone-Weirstrass Theorem, say that any sufficiently smooth function can be approximately by a suitably large net (Part and Sandberg, 1991). Typical activation functions for $\sigma(.)$ are bounded, measurable, non-decreasing functions from the real numbers onto [0,1], which include for instance the sigmoid and so on. Note that the selection of $\sigma(.)$ and the choice of the $N_2$ for a specified $S \subset R^n$, and neural net reconstruction error bound $\epsilon_N$, are current topics of research.

Lemma 2.1

Let $\sigma(.)$ be any bounded measurable non-decreasing function for a multilayered neural network. Then, the functional range of NN given by equation (2.3) is dense in $C^k(S)$.

Proof: See (Ortega et al., 1985).

In this result, the metric defining denseness is the supremum norm (Lewis et al., 1993), e.g., $\max_{x \in S} \|f(x)\|$, $f: S \to R^k$.

In general, equation (2.3) can be rewritten for an n-layer NN as $$f(x) = W_n^T \phi_n[W_{n-1}^T \phi_{n-1}( \ldots \phi_1(x(k))] + \epsilon(k), \quad (2.4)$$

wherein $W_n, W_{n-1}, \ldots, W_2, W_1$ are the constant weights and $\phi_{n-1}(.), \phi_{n-2}(.), \ldots, \phi_2(.), \phi_1(.)$ denote vectors of activation functions for the n−1 hidden layers, with $\phi_n(.)$ the vector of activation functions for the output layer. For notational convenience, the vector of activation functions of the input layer at the instant k is denoted as $\phi_1(k)=\phi(x(k))$. Then, the vectors of hidden and output layer activation functions are denoted by $$\phi_{m+1}(k) = \phi(W_m^T \phi_m(k)); \forall m=1, \ldots, n-1. \quad (2.5)$$

2.2 Stability and Passive Systems

In order to formulate the discrete-time controller, the following stability notions are needed (Vidyasagar, 1993). Consider the nonlinear system given by $$x(k+1) = f(x(k), u(k)), y(k) = h(x(k)), \quad (2.6)$$

where x(k) is a state vector, u(k) is the input vector and y(k) is the output vector. The solution is said to be globally uniformly ultimately bounded (GUUB) if for all $x(k_0)=x_0$, there exists and $\epsilon>0$ and a number $N(\epsilon, x_0)$ such that $\|x(k)\| < \epsilon$ for all $k \geq k_0 + N$.

Consider now the linear discrete time-varying system given by $$x(k+1) = A(k)x(k) + B(k)u(k), y(k) = C(k)x(k), \quad (2.7)$$

with A(k), B(k), C(k) are appropriately dimensional matrices.

Lemma 2.2: Define $\psi(k_1, k_0)$ as the state-transition matrix corresponding to A(k) for the system (2.7), i.e., $$\Psi(k_1, k_0) = \prod_{k=k_0}^{k_1-1} A(k).$$

Then if $\|\psi(k_1, k_0)\| \leq 1, \forall k_1, k_0 \geq 0$, the system (2.7) is exponentially stable.

Proof: See (Sadegh, 1991).

Some aspects of passivity (Goodwin and Sin, 1984) will subsequently be important. The set of time instants which are of interest is $Z_+ = \{0,1,2 \ldots \}$. Consider the Hilbert space $1_2^n(Z_+)$ of sequences $y: Z_+ \to R^n$ with inner product $<..>$ defined by $$\langle y, u \rangle = \sum_{k=0}^{\infty} y^T(k)u(k). \quad (2.8)$$

Let $P_T$ denote the operator that truncates the signal u at time T. We have $$P_T u(k) = u(k), k < T \quad (2.9)$$
$$= 0, k \geq T.$$

The basic signal space $1_{2e}^n(Z_+)$ is given by an extension of $1_2^n(Z_+)$ according to $$1_{2e}^n(Z_+) = \{u: Z_+ \to R^n 1 \forall T \in Z_+, P_T u \in 1_2^n(Z_+)\}.$$

It is convenient to use the notation $u_T = P_T u$ and $<y, u>_T = <y_T, u_T>$.

Define the energy supply function $E: 1_{2e}^m(Z_+) \times 1_{2e}^p(Z_+) \times Z_+ \to R$. A useful energy function E is the quadratic form $$E(u, y, T) = 2<y, Su>_T < u, Ru>_T, \quad (2.10)$$

with S and R appropriately defined matrices. In general, a system with input u(k) and output y(k) is said to be passive if it verifies an equality defined herein as the power form $$\Delta J = y^T(k)Su(k) + u^T(k)Ru(k) - g(k), \quad (2.11)$$

with J(k) lower bounded and g(k)≧0. In other words, $$E(u, y, T) \geq \sum_{k=0}^{T} g(k) - \gamma_0^2, \forall T \geq 0, \quad (2.12)$$

where $\gamma_0 \geq 0$.

A system is defined to be dissipative if it is passive and in addition $$E(u, y, T) \neq 0 \Rightarrow \sum_{k=0}^{T} g(k) > 0, \forall T \geq 0. \quad (2.13)$$

A special sort of dissipativity called state strict passivity (SSP) occurs if g(k) is a monic quadratic function of $\|x(k)\|$ with bounded coefficients, where x(k) represents the internal state of the system. Then the $l_2$ norm of the state is overbounded in terms of the $l_2$ inner product of the output and the input and the input sequence energy (i.e. power). This is used to advantage in concluding some internal boundedness properties of the system without the usual assumptions of observability (e.g., persistency of excitation), stability, and so on.

2.3 Dynamics of the mnth-Order MIMO System

Consider an mnth-order multi-input and multi-output discrete-time nonlinear system, to be controlled, given in multivariable canonical form $$x_1(k+1) = x_2(k) \quad (2.14)$$
$$\vdots$$
$$x_{n-1}(k+1) = x_n(k)$$
$$x_n(k+1) = f(x(k)) + u(k) + d(k),$$

with state $x(k) = [x_1^T(k), \ldots, x_n^T(k)]^T$ with $x_i(k) \in R^m$; i=1, ... n, control $u(k) \in R^m$, and $d(k) \in R^m$ a disturbance vector acting on the system at the instant k with $\|d(k)\| \leq d_M$ a known constant. Given a desired trajectory $x_{nd}(k)$ and its delayed values, define the tracking error as $$e_n(k) = x_n(k) - x_{nd}(k), \quad (2.15)$$

and the filtered tracking error, $r(k) \in R^m$, $$r(k) = e_n(k) + \lambda_1 e_{n-1}(k) + \ldots + \lambda_{n-1} e_1(k), \quad (2.16)$$

where $e_{n-1}(k), \ldots, e_1(k)$ are the delayed values of the error $e_n(k)$, and $\lambda_1, \ldots, \lambda_{n-1}$ are constant matrices selected so that $|z^{n-1} + \lambda_1 z^{n-2} + \ldots + \lambda_{n-1}|$ is stable. Equation (2.16) can be further expressed as $$r(k+1) = e_n(k+1) + \lambda_1 e_{n-1}(k+1) + \ldots + \lambda_{n-1} e_1(k+1), \quad (2.17)$$

Using (2.14) in (2.17), the dynamics of the MIMO system (2.14) can be written in terms of the filtered tracking error as $$r(k+1) = f(x(k)) - x_{nd}(k+1) + \lambda_1 e_n(k) + \ldots + \lambda_{n-1} e_2(k) + u(k) + d(k). \quad (2.18)$$

Define the control input u(k) as $$u(k) = x_{nd}(k+1) - \hat{f}(x(k)) + k_v r(k)) + k_v r(k) - \lambda_1 e_n(k) - \ldots - \lambda_{n-1} e_2(k), (2.19)$$

with the diagonal gain matrix $k_v$, and $\hat{f}(x(k))$ an estimate of f(x(k)). Then the closed-loop error system becomes $$r(k+1) = (k_v r(k)\tilde{f}(x(k)) + d(k), \quad (2.20)$$

where the functional estimation error is given by $$\tilde{f}(x(k)) = f(x(k)) - \hat{f}(x(k)). \quad (2.21)$$

This is an error system wherein the filtered tracking error is driven by the functional estimation error.

In the remainder of the this application, equation (2.20) is used to focus on selecting NN tuning algorithms that guarantee the stability of the filtered tracking error r(k). Then, since (2.17), with the input considered as r(k) and the output as e(k) describes a stable system, standard techniques (Slotine and Li, 1991) guarantee that e(k) exhibits stable behavior.

In general, the closed-loop tracking error system (2.20) can also be expressed as $$r(k+1) = k_v r(k) + \zeta_0(k), \quad (2.22)$$

where $$\zeta_0(k) = \tilde{f}(x(k)) + d(k). \quad (2.23)$$

The next dissipativity result holds for this system.

Theorem 2.2

The closed-loop tracking error system (2.22) is state strict passive from $\zeta_0(k)$ to $k_v r(k)$ provided that $$k_v^T k_v < I. \quad (2.24)$$

Proof: Select a Lyapunov function candidate $$J = r^T(k)r(k). \quad (2.25)$$

The first difference is given by $$\Delta J = r^T(k+1)r(k+1) - r^T(k)r(k). \quad (2.26)$$

Substituting (2.23) in (2.27) yields $$\Delta J = -r^T(k)[I - k_v^T k_v]r(k) + 2r^T(k)k_v\zeta_0 + \zeta_0^T(k)\zeta_0(k). \quad (2.27)$$

Note (2.27) is in power form defined in (2.11) with the first term taken as g(k), a monic quadratic function of the state r(k). Hence, (2.22) is a state strict passive system.

3. NN Controller Design

In the remainder of this application, a three-layer NN is considered initially and stability analysis is carried out for the closed-loop system (2.20). Thereafter, all the stability analysis presented for a three-layer NN is shown to be easily extended for a multilayer network having an arbitrary number of hidden layers. In this section, stability analysis by Lyapunov's direct method is performed for a family of multilayer weight tuning algorithms using a delta rule in each layer. These weight tuning paradigms yield a passive NN, yet persistency of excitation (PE) is generally needed for suitable performance. Specifically, this holds as well for standard backpropagation in the continuous-time case (Lewis et al., 1993) and the two-layer discrete-time case (Jagannathan and Lewis, 1993). Unfortunately, PE cannot generally be tested for or guaranteed in a NN, so that these naive multilayer weight tuning algorithms are generally doomed to failure. In addition, for guaranteed stability, the weight tuning using the delta rule at each layer must slow down as the NN becomes larger. By employing a projection algorithm, it is shown that the tuning rate can be made independent of the NN size. Modified tuning paradigms are finally proposed to make the NN robust so that the PE is not needed.

Assume that there exist some constant ideal weights $W_3$, $W_2$ and $W_1$ for a three-layer NN so that the nonlinear function in (2.14) can be written as $$f(x) = W_3^T \phi_3[W_2^T \phi_2[W_1^T \phi_1(x(k))]] + \epsilon(k), \quad (3.1)$$

where $\|\epsilon(k)\| < \epsilon_N$, with the bounding constant $\epsilon_N$ known. Unless the net is "minimal", suitable "ideal" weights may not be unique. The best weights may then be defined as those which minimize the supremum norm over S of $\epsilon(k)$. This issue is not a major concern here, as it is needed to known only the existence of such ideal weights; their actual values are not required.

For notational convenience define the matrix of all the ideal weights as $$Z = \begin{bmatrix} W_3 \\ W_2 \\ W_1 \end{bmatrix},$$

with padding by zeros as required for dimensional consistency. Then, some bounding assumptions can be stated.

Assumption 1 the ideal weights are bounded by known positive values so that $\|W_1\| \leq W_{1max}$, $\|W_2\| \leq W_{2max}$, and $\|W_3\| \leq W_{3max}$, or $\|Z\| \leq Z_{max}$.

3.1 Structure of the NN Controller and Error System Dynamics

Define the NN functional estimate by $$\hat{f}(x(k)) = \hat{W}_3^T(k)\phi_3(\hat{W}_2^T(k)\phi_2(\hat{W}_1^T(k)\phi_1(x(k)))), \quad (3.2)$$

$\hat{W}_3(k)$, $\hat{W}_2(k)$ and $\hat{W}_1(k)$ being the current value of the weights. The vector of input layer activation functions is given by $\hat{\phi}_1(k) = \phi_1(k) = \phi(x(k))$. Then the vector of activation functions of the hidden and output layer with the actual weights at the instant k is denoted by $$\hat{\phi}_m+1(k) = \phi(\hat{W}_m^T \hat{\phi}_m(k)); \forall m=1,\ldots,n-1. \quad (3.3)$$

Fact 2

The activation functions are bounded by known positive values so that $\|\hat{\phi}_1(k)\| \leq \phi_{1max}$, $\|\hat{\phi}_2(k)\| \leq \phi_{2max}$, and $\|\hat{\phi}_3(k)\| \leq \phi_{3max}$.

The error in the weights or weight estimation errors are given by $$\tilde{W}_3(k) = W_3 - \hat{W}_3(k), \tilde{W}_2(k) = W_2 - \hat{W}_2(k), \tilde{W}_1(k) = W_1 - \hat{W}_1(k), \tilde{Z}(k) = Z - \hat{Z}(k), \quad (3.4)$$

where $$\hat{Z} = \begin{bmatrix} \hat{W}_1 \\ \hat{W}_2 \\ \hat{W}_3 \end{bmatrix}$$

and the hidden-layer output errors are defined as $$\tilde{\phi}_2(k) = \phi_2 - \hat{\phi}_2(k), \tilde{\phi}_3(k) = \phi_3 - \hat{\phi}_3(k). \quad (3.5)$$

Select the control input u(k) to be $$u(k) = x_{nd}(k+1) - \hat{W}_3^T(k)\hat{\phi}_3(k) - \lambda_1 e_n(k) - \ldots - \lambda_{n-1}e_2(k) + k_v r(k), \quad (3.6)$$

where the functional estimate (3.2) is provided by a three-layer NN and denoted in (3.6) by $\hat{W}_3^T(k)\hat{\phi}_3(k)$. Then, the closed-loop filtered error dynamics become $$r(k+1) = k_v r(k) + e_i(k) + \tilde{W}_3^T(k)\phi_3(k) + \epsilon(k) + d(k), \quad (3.7)$$

where the identification error is defined by $$e_i(k) = \tilde{W}_3^T(k)\hat{\phi}_3(k). \quad (3.8)$$

Figure 2:
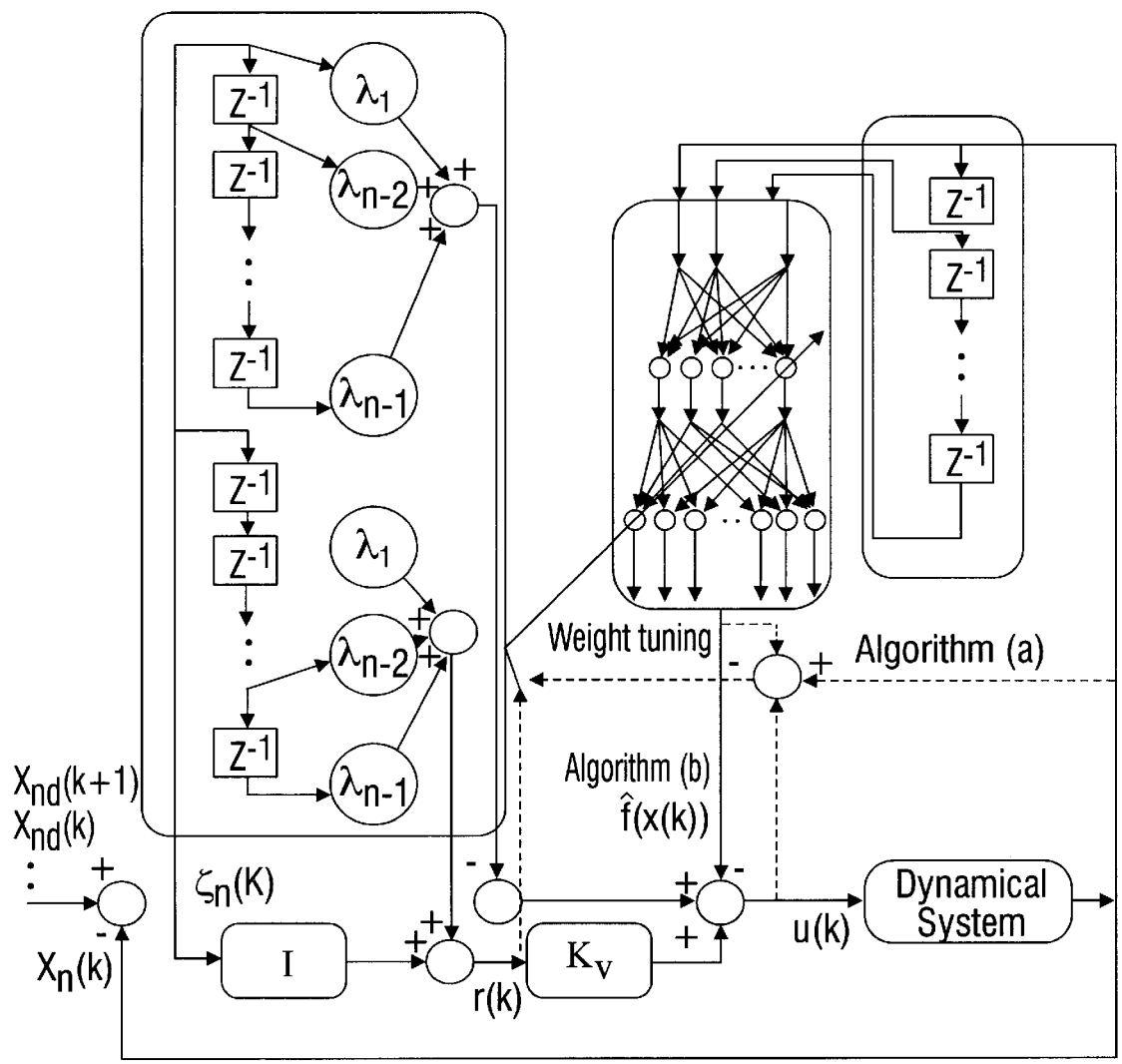
FIG. 2 is a block diagram of a neural network controller according to the present invention.

The proposed NN controller structure is shown in FIG. 2. The output of the plant is processed through a series of delays in order to obtain the past values of the output, and fed as inputs to the NN so that the nonlinear function in (2.14) can be suitably approximated. Thus, the NN controller derived in a straightforward manner using filtered error notion naturally provides a dynamical NN structure. Note that neither the input u(k) or its past values are needed by the NN. The next step is to determine the weight updates so that the tracking performance of the closed-loop filtered error dynamics is guaranteed.

3.2 Weight Updates for Guaranteed Tracking Performance

A family of NN weight tuning paradigms that guarantee the stability of the closed-loop system (3.7) is presented in this section. It is required to demonstrate that the tracking error r(k) is suitably small and that the NN weights $\hat{W}_3(k)$, $\hat{W}_2(k)$ and $\hat{W}_1(k)$ remain bounded, for then the control u(k) is bounded. In order to proceed further, the following definitions are needed.

Lemma 3.1: If $A(k) = I - \alpha\phi(x(k))\phi^T(x(k))$ in (2.7), where $0 < \alpha < 2$ and $\phi(x(k))$ is a vector of basis functions, then $\|\phi(k_1, k_0)\| < 1$ is guaranteed if there is an L>0 such that $$\sum_{k=k_0}^{k_1+L-1} \varphi(x(k))\varphi^T(x(k)) > 0$$

for all k. Then, Lemma 2.2 guarantees the exponential stability of the system (2.7).

Proof: See (Sadegh, 1991).

Definition 3.2: An input sequence x(k) is said to be persistently exciting (Sadegh, 1991) if there are $\lambda > 0$ and an integer $k_1 \geq 1$ such that $$\lambda_{min}\left[\sum_{k=k_0}^{k_1} \varphi(x(k))\varphi^T(x(k))\right] > \lambda, \forall k_0 \geq 0, \quad (3.9)$$

where $\lambda_{min}(P)$ represents the smallest eigenvalue of P.

Note that PE is exactly the stability condition needed in Lemma 3.1.

In the following, it is considered that the neural net reconstruction error bound $\epsilon_N$ and the disturbance bound $d_M$ are nonzero but known constants. Theorem 3.3 gives two alternative weight tuning algorithms, one based on a modified functional estimation error and the other based on the filtered tracking error, guaranteeing that both the tracking error and the error in the weight estimates are bounded if a PE condition holds.

Theorem 3.3

Let the desired trajectory $x_{nd}(k)$ be bounded and the NN functional reconstruction error and the disturbance bounds, $\epsilon_N, d_M$, respectively, be known constants. Take the control input for (2.14) as equation (3.6) and the weight tuning provided for the input and hidden layers as $$\hat{W}_1(k+1) = \hat{W}_1(k) - \alpha_1 \hat{\phi}_1(k)\hat{y}_1^T(k), \quad (3.10)$$

$$\hat{W}_2(k+1) = \hat{W}_2(k) - \alpha_2 \hat{\phi}_2(k)\hat{y}_2^T(k), \quad (3.11)$$

where $$\hat{y}_1(k) = \hat{W}_1^T(k)\hat{\phi}_1(k), \hat{y}_2(k) = \hat{W}_2^T(k)\hat{\phi}_1(k), \hat{y}_2(k) = \hat{W}_2^T(k)\hat{\phi}_2(k). \quad (3.12)$$

and the weight tuning update for the output layer is given by either:

a) $\hat{W}_3(k+1) = \hat{W}_3(k) + \alpha_3 \hat{\phi}_3(k) \bar{f}^T(k)$, (3.13)

where $\bar{f}(k)$ is defined as the functional augmented error given by $$\bar{f}(k) = x_n(k+1) - u(k) - \bar{f}(x(k)),$$

or b) $\hat{W}_3(k+1) = \hat{W}_3(k) + \alpha_3 \hat{\phi}_3(k) r^T(k+1)$, (3.15)

with $\alpha_i > 0$, $\forall i = 1,2,3$ denoting constant learning rate parameters or adaptation gains.

Let the output vectors of the input, hidden, and output layers, $\hat{\phi}_1(k)$, $\hat{\phi}_2(k)$, and $\hat{\phi}_3(k)$, be persistently exciting, then the filtered tracking error $r(k)$ and the error in weight estimates, $\tilde{W}_1(k)$, $\tilde{W}_2(k)$ and $\tilde{W}_3(k)$, are GUUB provided the following conditions hold:

1) $\alpha_i \varphi_{i\max}^2 < 2$, $\forall i = 1, 2$, (3.16)
   $< 1$, $\forall i = 3$, 2) $k_{v\max} < \dfrac{1}{\sqrt{\eta}}$, (3.17)

where $\eta$ is given for algorithm (a) as $$\eta = \frac{1}{(1 - \alpha_3 \varphi_{3\max}^2)}, \quad (3.18)$$

and for algorithm (b) as $$\eta = \frac{1}{(1 - \alpha_3 \varphi_{3\max}^2)}. \quad (3.19)$$

Remark: PE has not been defined in the literature, to our knowledge, for a multilayer NN and therefor, PE is defined and verified for a multilayer NN during the proof.

Proof:
Algorithm (a): Define the Lyapunov function candidate $$J = r^T(k)r(k) + \frac{1}{\alpha_1} tr\left(\tilde{W}_1^T(k)\tilde{W}_1(k)\right) + \qquad (3.20)$$
$$\frac{1}{\alpha_2} tr\left(\tilde{W}_2^T(k)\tilde{W}_2(k)\right) + \frac{1}{\alpha_3} tr\left(\tilde{W}_3^T(k)\tilde{W}_3(k)\right).$$

The first difference is $$\Delta J = r^T(k+1)r(k+1) - r^T(k)r(k) + \qquad (3.21)$$
$$\frac{1}{\alpha_1} tr\left[\tilde{W}_1^T(k+1)\tilde{W}_1(k+1) - \tilde{W}_1^T(k)\tilde{W}_1(k)\right] +$$
$$\frac{1}{\alpha_2} tr\left[\tilde{W}_2^T(k+1)\tilde{W}_2(k+1) - \tilde{W}_2^T(k)\tilde{W}_2(k)\right] +$$
$$\frac{1}{\alpha_3} tr\left[\tilde{W}_3^T(k+1)\tilde{W}_3(k+1) - \tilde{W}_3^T(k)\tilde{W}_3(k)\right].$$

Substituting equations (3.7) and (3.10) through (3.13) in (3.21), collecting terms together, and completing the square yields $$\Delta J = -r^T(k)[-k_v^T k_v]r(k) + 2(k_v r(k))^T [W_3^T \tilde{\varphi}_3(k) + \varepsilon(k) + d(k)] + \qquad (3.22)$$
$$(1 + \alpha_3 \hat{\varphi}_3^T \hat{\varphi}_3)[W_3^T \tilde{\varphi}_3(k) + \varepsilon(k) + d(k)]^T [W_3^T \tilde{\varphi}_3(k) + \varepsilon(k) + d(k)] +$$
$$\frac{W_{1\max}^2 \varphi_{1\max}^2}{(2 - \alpha_1 \varphi_{1\max}^2)} + \frac{W_{2\max}^2 \varphi_{2\max}^2}{(2 - \alpha_2 \varphi_{2\max}^2)} -$$
$$[1 - \alpha_3 \hat{\varphi}_3^T(k)\hat{\varphi}_3(k)]\left[e_i(k) - \frac{(k_v r(k) + \alpha_3 \hat{\varphi}_3^T(k)\hat{\varphi}_3(k)(W_3^T \tilde{\varphi}_3(k) + \varepsilon(k) + d(k)))}{[1 - \alpha_3 \hat{\varphi}_3^T(k)\hat{\varphi}_3(k)]}\right]^T \left[e_i(k) - \right.$$
$$\left. \frac{(k_v r(k) + \alpha_3 \hat{\varphi}_3^T(k)\hat{\varphi}_3(k)(W_3^T \tilde{\varphi}_3(k) + \varepsilon(k) + d(k)))}{[1 - \alpha_3 \hat{\varphi}_3^T(k)\hat{\varphi}_3(k)]}\right] +$$
$$\frac{1}{[1 - \alpha_3 \hat{\varphi}_3^T(k)\hat{\varphi}_3(k)]}[k_v r(k) + \alpha_3 \hat{\varphi}_3^T(k)\hat{\varphi}_3(k)(W_3^T \tilde{\varphi}_3(k) + \varepsilon(k) + d(k))]^T [k_v r(k) +$$
$$\alpha_3 \hat{\varphi}_3^T(k)\hat{\varphi}_3(k)(W_3^T \tilde{\varphi}_3(k) + \varepsilon(k) + d(k))] - -$$
$$(2 - \alpha_1 \hat{\varphi}_1^T(k)\hat{\varphi}_1(k))\left\|\hat{W}_1^T(k)\hat{\varphi}_1(k) - \frac{(1 - \alpha_1 \hat{\varphi}_1^T \hat{\varphi}_1)}{(2 - \alpha_1 \hat{\varphi}_1^T \hat{\varphi}_1)} W_1^T \hat{\varphi}_1 \right\|^2 -$$
$$(2 - \alpha_2 \hat{\varphi}_2^T(k)\hat{\varphi}_2(k))\left\|\hat{W}_2^T(k)\hat{\varphi}_2(k) - \frac{(1 - \alpha_2 \hat{\varphi}_2^T \hat{\varphi}_2)}{(2 - \alpha_2 \hat{\varphi}_2^T \hat{\varphi}_2)} W_2^T \hat{\varphi}_2 \right\|^2 \quad \Delta J \le$$
$$-(1 - \eta k_{v\max}^2)\left[\|r(k)\|^2 - 2\frac{\gamma k_{v\max}}{(1 - \eta k_{v\max}^2)}\|r(k)\| - \frac{\rho}{(1 - \eta k_{v\max}^2)}\right] - [1 -$$
$$\alpha_3 \varphi_{3\max}^2]\left\|e_i(k) - \frac{(k_v r(k) + \alpha_3 \hat{\varphi}_3^T(k)\hat{\varphi}_3(k)(W_3^T \tilde{\varphi}_3(k) + \varepsilon(k) + d(k)))}{[1 - \alpha_3 \hat{\varphi}_3^T(k)\hat{\varphi}_3(k)]}\right\|^2 -$$
$$(2 - \alpha_1 \hat{\varphi}_1^T(k)\hat{\varphi}_1(k))\left\|\hat{W}_1^T(k)\hat{\varphi}_1(k) - \frac{(1 - \alpha_1 \hat{\varphi}_1^T \hat{\varphi}_1)}{(2 - \alpha_1 \hat{\varphi}_1^T \hat{\varphi}_1)} W_1^T \hat{\varphi}_1 \right\|^2 -$$
$$(2 - \alpha_2 \hat{\varphi}_2^T(k)\hat{\varphi}_2(k))\left\|\hat{W}_2^T(k)\hat{\varphi}_2(k) - \frac{(1 - \alpha_2 \hat{\varphi}_2^T \hat{\varphi}_2)}{(2 - \alpha_2 \hat{\varphi}_2^T \hat{\varphi}_2)} W_2^T \hat{\varphi}_2 \right\|^2$$

where η is given in (3.18) with $k_{vmax}$ the maximum singular value of $k_v$ and $$\gamma = \frac{1}{(1-\alpha_3\varphi_{3max}^2)}[W_{3max}\tilde{\varphi}_{3max} + \varepsilon_N + d_M], \quad (3.23)$$

and $$\rho = \left[\frac{(W_{3max}\tilde{\varphi}_{3max} + \varepsilon_N + d_M)^2}{(1-\alpha_3\varphi_{3max}^2)} + \frac{\varphi_{1max}^2 W_{1max}^2}{(2-\alpha_1\varphi_{1max}^2)} + \frac{\varphi_{2max}^2 W_{2max}^2}{(2-\alpha_2\varphi_{2max}^2)}\right]. \quad (3.24)$$

Since $(\varepsilon_N + d_M)$ is constant, $\Delta J \leq 0$ as long as $$\|r(k)\| > \frac{1}{(1-\eta k_{vmax}^2)}\left[\gamma k_{vmax} + \sqrt{\gamma^2 k_{vmax}^2 + \rho(1-\eta k_{vmax}^2)}\right]. \quad (3.25)$$

-continued $$\left|\sum_{k=k_0}^{\infty}\Delta J(k)\right| = |J(\infty) - J(0)| < \infty \text{ since } \Delta J \leq 0$$

as long as (3.16), (3.17) and (3.25) hold.

This demonstrates that the tracking error r(k) is bounded for all $k \geq 0$ and it remains to show that the weight estimates $\hat{W}_1(k)$, $\hat{W}_2(k)$, and $\hat{W}_3(k)$, or equivalently $\tilde{W}_1(k)$, $\tilde{W}_2(k)$, and $\tilde{W}_3(k)$, are bounded.

The dynamics relative to error in weight estimates using (3.10), (3.11) and (3.13) are given by $$\tilde{W}_1(k+1) = [I - \alpha_1\hat{\phi}_1(k)\hat{\phi}_1^T(k)]\tilde{W}_1(k) + \alpha_1\hat{\phi}_1(k)\hat{\phi}_1^T(k)W_1, \quad (3.26)$$

$$\tilde{W}_2(k+1) = [I - \alpha_2\hat{\phi}_2(k)\hat{\phi}_2^T(k)]\tilde{W}_2(k) + \alpha_2\hat{\phi}_2(k)\hat{\phi}_2^T(k)W_2, \quad (3.27)$$

$$\tilde{W}_3(k+1) = [I - \alpha_2\hat{\phi}_3(k)\hat{\phi}_3^T(k)]\tilde{W}_3(k) + \alpha_3\hat{\phi}_3(k)\hat{\phi}_3^T(k)W_3, \quad (3.28)$$

where the functional reconstruction error ε(k) and the disturbance d(k) are considered to be bounded. Applying the PE condition (3.9) and Lemma 3.1 by using $\phi(k) = \hat{\phi}_1(k) = \hat{\phi}_1(k)$; $\forall i=1; \ldots, 3$, the boundedness of $\tilde{W}_1(k)$, $\tilde{W}_2(k)$, and $\tilde{W}_3(k)$, in 3.26), (3.27), and (3.28), respectively, and hence of $\hat{W}_1(k)$, $\hat{W}_2(k)$, and $\hat{W}_3(k)$, are assured.

Algorithm (b): Define a Lyapunov function candidate as in (3.20). Substituting (3.7), (3.10) through (3.12) and (3.15) in (3.21), collecting terms together, and completing the square yields $$\Delta J \leq -r^T(k)[I - \eta k_v^T k_v]r(k) + 2\eta(k_v r(k))^T(W_3^T\tilde{\varphi}_3(k) + \varepsilon(k) + d(k)) + \quad (3.29)$$
$$\eta[W_3^T\tilde{\varphi}_3(k) + \varepsilon(k) + d(k)]^T(W_3^T\tilde{\varphi}_3(k) + \varepsilon(k) + d(k)) +$$
$$\frac{W_{1max}^2\varphi_{1max}^2}{(2-\alpha_1\varphi_{1max}^2)} + \frac{W_{2max}^2\varphi_{1max}^2}{(2-\alpha_1\varphi_{1max}^2)} -$$
$$[1-\alpha_3\hat{\varphi}_3^T(k)\hat{\varphi}_3(k)]\left[e_i(k) - \frac{\alpha_3\hat{\varphi}_3^T(k)\hat{\varphi}_3(k)(k_v r(k) + (W_3^T\tilde{\varphi}_3(k) + \varepsilon(k) + d(k)))}{[1-\alpha_3\hat{\varphi}_3^T(k)\hat{\varphi}_3(k)]}\right]^T\left[e_i(k) - \frac{\alpha_3\hat{\varphi}_3^T(k)\hat{\varphi}_3(k)(k_v r(k) + (W_3^T\tilde{\varphi}_3(k) + \varepsilon(k) + d(k)))}{[1-\alpha_3\hat{\varphi}_3^T(k)\hat{\varphi}_3(k)]}\right] -$$
$$\left(2-\alpha_1\hat{\varphi}_1^T(k)\hat{\varphi}_1(k)\right)\left\|\hat{W}_1^T(k)\hat{\varphi}_1(k) - \frac{(1-\alpha_1\hat{\varphi}_1^T\hat{\varphi}_1)}{(2-\alpha_1\hat{\varphi}_1^T\hat{\varphi}_1)}W_1^T\hat{\varphi}_1\right\|^2 -$$
$$(2-\alpha_2\hat{\varphi}_2^T(k)\hat{\varphi}_2(k))\left\|\hat{W}_2^T(k)\hat{\varphi}_2(k) - \frac{(1-\alpha_2\hat{\varphi}_2^T\hat{\varphi}_2)}{(2-\alpha_2\hat{\varphi}_2^T\hat{\varphi}_2)}W_2^T\hat{\varphi}_2\right\|^2 \Delta J \leq$$
$$-(1-\eta k_{vmax}^2)\left[\|r(k)\|^2 - 2\frac{\eta\gamma k_{vmax}}{(1-\eta k_{vmax}^2)}\|r(k)\| - \frac{\rho}{(1-\eta k_{vmax}^2)}\right] - [1-$$
$$\alpha_3\hat{\varphi}_3^T(k)\hat{\varphi}_3(k)]\left\|e_i(k) - \frac{\alpha_3\hat{\varphi}_3^T(k)\hat{\varphi}_3(k)(k_v r(k) + (W_3^T\tilde{\varphi}_3(k) + \varepsilon(k) + d(k)))}{[1-\alpha_3\hat{\varphi}_3^T(k)\hat{\varphi}_3(k)]}\right\|^2 -$$
$$(2-\alpha_1\hat{\varphi}_1^T(k)\hat{\varphi}_1(k))\left\|\hat{W}_1^T(k)\hat{\varphi}_1(k) - \frac{(1-\alpha_1\hat{\varphi}_1^T\hat{\varphi}_1)}{(2-\alpha_1\hat{\varphi}_1^T\hat{\varphi}_1)}W_1^T\hat{\varphi}_1\right\|^2 -$$
$$(2-\alpha_2\hat{\varphi}_2^T(k)\hat{\varphi}_2(k))\left\|\hat{W}_2^T(k)\hat{\varphi}_2(k) - \frac{(1-\alpha_2\hat{\varphi}_2^T\hat{\varphi}_2)}{(2-\alpha_2\hat{\varphi}_2^T\hat{\varphi}_2)}W_2^T\hat{\varphi}_2\right\|^2,$$

with η is given by (3.19) and where $$\gamma = \eta[W_{3max}\tilde{\varphi}_{3max} + \varepsilon_N + d_M], \quad (3.30)$$

and $$\rho = \eta(W_{3max}\tilde{\varphi}_{3max} + \varepsilon_N + d_M)^2 + \frac{W_{1max}^2\varphi_{1max}^2}{(2-\alpha_1\varphi_{1max}^2)} + \frac{W_{2max}^2\varphi_{2max}^2}{(2-\alpha_2\varphi_{2max}^2)}. \quad (3.31)$$

$\Delta J \leq 0$ as long as equations (3.16), (3.17) hold and $$\|r(k)\| > \frac{1}{(1-\eta k_{vmax}^2)}\left[\gamma k_{vmax} + \sqrt{\gamma^2 k_{vmax}^2 + \rho(1-\eta k_{vmax}^2)}\right]. \quad (3.32)$$

the remainder of the proof follows similarly to that for algorithm (a).

One of the drawbacks of the available methodologies that guarantee the tracking and bounded weights (Lewis et al., 1993) is the lack of generalization of stability analysis to NN having arbitrary numbers of hidden layers. The reason is partly due to the problem of defining and verifying the persistency of excitation for a multilayered NN. For instance, in the case of a three layer continuous-time NN (Lewis et al., 1993), the PE conditions are not easy to derive as one is faced with the observability properties of a certain bilinear system. However, according to the proof presented in Theorem 3.3, the PE for a multilayer NN is defined as the PE (in the sense of Definition 3.2) of all the hidden layer inputs $\hat{\phi}_i(k)$; $\forall i = 1, \ldots, n$.

The following corollary presents the generalization of Theorem 3.3 to NN having an arbitrary number of hidden layers when the NN functional reconstruction error and the unmodeled disturbances are nonzero but bounded by known constants.

Corollary 3.4

Assume the hypotheses presented in Theorem 3.3 and take the weight tuning of an n-layer NN provided for the input and the hidden layers as $$\hat{W}_i(k+1) = \hat{W}_i(k) - \alpha_i \hat{\varphi}_i(k) \hat{y}_i^T(k), \; \forall i = 1, \ldots, n-1 \quad (3.33)$$

where $$\hat{y}_i(k) = \hat{W}_i^T(k) \hat{\varphi}_i(k); \; \forall i = 1, \ldots, n-1, \quad (3.34)$$

and the weight tuning update for the output layer is given by either:

a) $\hat{W}_n(k+1) = \hat{W}_n(k) + \alpha_n \hat{\phi}_n(k) \hat{r}^T(k),$ (3.35)

or b) $\hat{W}_n(k+1) = \hat{W}_n(k) + \alpha_n \hat{\phi}_n(k) r^T(k+1),$ (3.36)

with $\alpha_i > 0$, $\forall i = 1, 2, 3, \ldots n$ denoting constant learning rate parameters or adaptation gains.

Let the output vectors of the input, hidden and output layers, $\hat{\phi}_i(k)$; $\forall i=1, 2, \ldots, n$, be persistently exciting, then the filtered tracking error $r(k)$ and the error in weight estimates, $\tilde{W}_i(k)$; $\forall i=1, 2, \ldots, n$, are GUUB provided the condition 1) $\alpha_i \varphi_{i\max}^2 < 2, \; \forall i = 1, \ldots, n-1,$ (3.37)

$< 1, \quad i = n,$

2) $k_{v\max} < \dfrac{1}{\sqrt{\eta}},$ (3.38)

hold where $\eta$ is given for algorithm (a) as $$\eta = 1 + \frac{1}{(1 - \alpha_n \varphi_{n\max}^2)}, \quad (3.39)$$

and for algorithm (b) as $$\eta = \frac{1}{(1 - \alpha_n \varphi_{n\max}^2)}. \quad (3.40)$$

Proof: Consider the filtered tracking error dynamics (3.7) and rewrite (3.7) for an n-layer NN to obtain $$r(k+1) = k_v r(k) + e_i(k) + W_n^T \phi_n(k) + \epsilon(k) + d(k), \quad (3.41)$$

where the identification error is given by $$e_i(k) = \tilde{W}_n^T(k) \hat{\phi}_n(k). \quad (3.42)$$

Algorithm (a): Define the Lyapunov function candidate $$J = r^T(k) r(k) + \sum_{i=1}^{n} \frac{1}{\alpha_i} tr(\tilde{W}_i^T(k) \tilde{W}_i(k)). \quad (3.43)$$

The first difference is $$\Delta J = r^T(k+1) r(k+1) - r^T(k) r(k) + \quad (3.44)$$

$$\sum_{i=1}^{n} \frac{1}{\alpha_i} tr[\tilde{W}_i^T(k+1) \tilde{W}(k+1) - \tilde{W}_i^T(k) \tilde{W}_i(k)]$$

Considering the input and hidden (3.33), output (3.35) weight updates as well the tracking error dynamics (3.41), and using these in (3.44), one may obtain $$\Delta J \leq -(1 - \eta k_{v\max}^2) \|r(k)\|^2 + 2 k_{v\max} \gamma \|r(k)\| + \rho - [1 - \alpha_n \hat{\varphi}_n^T(k) \hat{\varphi}_n(k)] \left\| e_i(k) - \right. \quad (3.45)$$

$$\left. \frac{[k_v r(k) + \alpha_n \hat{\varphi}_n^T(k) \hat{\varphi}_n(k)(W_n^T \tilde{\varphi}_n(k) + \varepsilon(k) + d(k))]}{[1 - \alpha_n \hat{\varphi}_n^T(k) \hat{\varphi}_n(k)]} \right\|^2 -$$

$$\sum_{i=1}^{n-1} [2 - \alpha_i \hat{\varphi}_i^T(k) \hat{\varphi}_i(k)] \left\| \hat{W}_i^T(k) \hat{\varphi}_i(k) - \frac{[1 - \alpha_i \hat{\varphi}_i^T(k) \hat{\varphi}_i(k)]}{[2 - \alpha_i \hat{\varphi}_i^T(k) \hat{\varphi}_i(k)]} W_i^T \hat{\varphi}_i(k) \right\|^2$$

where $$\gamma = (\eta - 1)[W_{n\max}^T \tilde{\varphi}_{n\max} + \varepsilon_N + d_M], \quad (3.46)$$

and $$\rho = (\eta - 1)[W_{n\max}^T \tilde{\varphi}_{n\max} + \varepsilon_N + d_M]^2 + \sum_{i=1}^{n-1} \frac{W_{i\max}^2 \varphi_{i\max}^2}{[2 - \alpha_i \varphi_{i\max}^2]}, \quad (3.47)$$

with η given in (3.39) ΔJ≦0 as long as conditions (3.37), (3.38) hold and the bound on the filtered tracking error is given in (3.25) where the constants γ and ρ are presented in (3.46) and (3.47) respectively. This demonstrates the GUUB of r(k) and it remains to show that the weight estimates, $\hat{W}_i(k)$, ∀i=1, . . . , n, or equivalently $\tilde{W}_i(k)$, ∀i=1, . . . , n, are bounded.

The dynamics relative to error in weight estimates are given for the input and hidden layers as $$\tilde{W}_i(k+1)=[I-\alpha_i\hat{\phi}_i^T(k)\hat{\phi}_i(k)]\tilde{W}_i(k)+\alpha_i\hat{\phi}_i(k)\hat{\phi}_i^T(k)W_i, \forall i=1, \ldots, n\text{(3.48)}$$

and for the output layer as $$\tilde{W}_n(k+1)=[I-\alpha_n\hat{\phi}_n^T(k)\hat{\phi}_n(k)]\tilde{W}_n(k)+\alpha_n\hat{\phi}_n(k)[W_n^T\tilde{\phi}_n(k)+\epsilon_N+d(k)]\text{(3.49)}$$

where the functional reconstruction error and disturbances are considered to be bounded. Applying the PE condition (3.9) and Lemma (3.1) with φ(k)=$\hat{\phi}_i$(k); ∀i=1, . . . , n, the boundedness of $\tilde{W}_i(k)$, ∀i=1, . . . , n, in (3.48) and (3.49) and hence of $\hat{W}_i(k)$, ∀i=1, . . . , n, are assured.

Algorithm (b): Define the Lyapunov function candidate as in (3.43). Substituting (3.33), (3.36) and (3.41) in (3.44), collecting terms together, and completing the square yields $$\Delta J \leq -(1-\eta k_{vmax}^2)\|r(k)\|^2 + 2k_{vmax}\gamma\|r(k)\| + \rho - [1-\alpha_n\hat{\varphi}_n^T(k)\hat{\varphi}_n(k)]\left\|e_i(k) - \frac{\alpha_n\hat{\varphi}_n^T(k)\hat{\varphi}_n(k)}{[1-\alpha_n\hat{\varphi}_n^T(k)\hat{\varphi}_n(k)]}[k_v r(k)+(W_n^T\tilde{\varphi}_n(k)+\varepsilon(k)+d(k))]\right\|^2 - \sum_{i=1}^{n-1}[2-\alpha_i\hat{\varphi}_i^T(k)\hat{\varphi}_i(k)]\left\|\hat{W}_i^T(k)\hat{\varphi}_i(k)-\frac{[1-\alpha_i\hat{\varphi}_i^T(k)\hat{\varphi}_i(k)]}{[2-\alpha_i\hat{\varphi}_i^T(k)\hat{\varphi}_i(k)]}W_i^T\hat{\varphi}_i(k)\right\|^2,$$

(3.50)

where $$\gamma = \eta[W_{nmax}^T\tilde{\varphi}_{nmax}+\varepsilon_N+d_M]$$ (3.51)

and $$\rho = \eta[W_{nmax}^T\tilde{\varphi}_{nmax}+\varepsilon_N+d_M]^2 + \sum_{i=1}^{n-1}\frac{W_{imax}^2\varphi_{imax}^2}{[2-\alpha_i\varphi_{imax}^2]},$$ (3.52)

with η given in (3.40). The remainder of the proof follows similarly to that of algorithm (a).

Note from (3.25) and (3.32), that the tracking error increases with the NN reconstruction error bound $\epsilon_N$ and the disturbance bound $d_M$, yet small tracking errors, but not arbitrarily small, may be achieved by selecting small gains $k_v$. In other words, placing the closed-loop error poles arbitrarily close to the origin inside the unit circle forces smaller tracking errors. In contrast, by selecting large gains for the case of continuous system, arbitrarily small tracking errors can be obtained (Ortega et al., 1985).

It is important to note that the problem of initializing the net weights (referred to as symmetric breaking (Slotine and Li, 1991)) occurring in other techniques in the literature does not arise, since when $\hat{Z}(0)$ is taken as zero (with nonzero thresholds) the PD term of $k_v r(k)$ stabilizes the plant, on an interim basis, for instance in certain restricted class of nonlinear system such as robotic systems. Thus, the NN controller requires no learning phase.

3.3 projection Algorithm

The adaptation gains for an n-layer NN, $\alpha_i > 0$, ∀i=1, 2, . . . n, are constant parameters in the update laws presented in (3.33) through (3.36). These update laws correspond to the delta rule (Slotine and Li, 1991; Tomizuka, 1993), or referred to as the Widrow-Hoff rule (24), used in standard backpropagation. This reveals that the update tuning mechanisms employing the delta rule have a major drawback. In fact using (3.37), the upper bound on the adaptation gain can be obtained as $$\alpha_i < \frac{2}{\varphi_{imax}^2}, \forall i = 1, \ldots, n-1,$$ (3.53)

$$< \frac{1}{\varphi_{imax}^2}, i = n.$$

Since $\hat{\phi}_i(k) \in R^{N_{pi}}$, with $N_p$ the number of hidden-layer neurons in the ith layer, it is evident that the upper bound on the adaptation gain at each layer depends upon the number of hidden-layer neurons present in that particular layer. Specifically, if there are $N_p$ hidden-layer neurons and the maximum value of each hidden-node output in the ith layer is taken as unity (as for the sigmoid), then the bounds on the adaptation gain in order to assure stability of the closed-loop system are given by $$0 < \alpha_i < \frac{2}{N_p}, \forall i = 1, \ldots, n-1,$$ (3.54)

$$0 < \alpha_i < \frac{1}{N_p}, i = n.$$

In other words, the upper bound on the adaptation gain at each layer for the case of delta rule decreases with increase in the number of hidden-layer nodes in that particular layer, so that learning must slow down for guaranteed performance. The phenomenon of large NN requiring very slow learning rates has often been encountered in the practical NN literature (Chen and Khalil, 1992; Narenda and Parthasarathy, 1990), but never adequately explained.

This major drawback can be easily overcome by modifying the update rule at each layer in order to obtain a projection algorithm (Jagannathan and Lewis, 1996). To wit, replace the constant adaptation gain at each layer by $$\alpha_i = \frac{\xi_i}{\zeta_i + \|\hat{\varphi}_i(k)\|^2}, \forall i = 1, \ldots, n$$ (3.55)

where $$\zeta_i > 0, \forall i=1, \ldots, n$$ (3.56)

and $$0 < \xi_i < 2, \forall i = 1, \ldots, n-1$$

$$0 < \xi_i < 1, \forall i = n \quad (3.57)$$

are constants. Note that $\xi_i$, $\forall i=1, \ldots n$ is now the new adaptation gain at each layer and it is always true that $$\frac{\xi_i}{\zeta_i + \|\hat{\varphi}_i(k)\|^2} \|\hat{\varphi}_i(k)\|^2 < 2, \forall i = 1, \ldots, n-1 \quad (3.58)$$

$$< 1, \forall i = n,$$

hence guaranteeing (3.37) for every $N_p$ at each layer.

From the bounds indicated for the adaptation gains in (3.58), it is interesting to not that the upper bound on the adaptation gains for the input and hidden layers is 2 whereas for the output layer the upper bound is given by 1. It appears that the hidden layers act as pattern extractors (Rumelhart et al., 1990). In other words, the hidden layers of a multilayer NN are employed for the identification of the nonlinear plant and the output layer is used for controlling the plant. Nowhere else does there appear an upper bound less than 1 for the adaptation gains in the output layer.

Note that for guaranteed closed-loop stability, it is necessary that the hidden-layer outputs $\hat{\phi}_i(k)$; $\forall i=1, \ldots, n$, be PE. In other words, Theorem 3.3 and Corollary 3.4 reveal the necessity of the PE condition to guarantee boundedness of the weight estimates in the presence of unmodelled bounded disturbances and functional reconstruction errors. However, it is very difficult to verify or guarantee the PE of the hidden-layer output functions $\hat{\phi}_i(k)$; $\forall i=1, \ldots, n$, in the case of a multilayer NN. This possible unboundedness of the weight estimates (c.f. parameter estimates in adaptive control) when PE fails to hold is known as parameter drift (Ortega et al., 1985). In the next section, improved weight tuning paradigms are presented so that PE is not required.

3.4 Weight Tuning Modification for Relaxation of Persistency of Excitation Condition Approaches such as σ-modification (Sira-Ramirez and Zak, 1991), or e-modification (Park and Sandberg, 1991) are available for the robust adaptive control of continuous systems wherein the persistency of excitation condition is not needed. A three-layer NN with continuous weight update laws and e-modification was developed (Lewis et al., 1993), and the GUUB of both the tracking error and the error in weight estimates was demonstrated. However, modification to the standard weight tuning mechanisms in discrete-time without the necessity of PE is, yet to be investigated in both the NN and adapative control communities. In our previous paper (Jagannathan and Lewis, 1993), an approach similar to e-modification is derived for two-layer (i.e., linear) discrete-time NN. In this invention, the modified weight tuning algorithms discussed for a two-layer discrete-time NN in (Jagannathan and Lewis, 1993) are extended to a multilayer discrete-time NN so that Pe is not needed. In fact, the following theorem shows two tuning algorithms that overcome the need for PE in the case of a multilayer NN.

Theorem 3.5

Assume the hypotheses presented in Theorem 3.3, and consider the modified weight tuning algorithms provided for the input and hidden layers as $$\hat{W}_1(k+1) = \hat{W}_1(k) - \alpha_1 \hat{\phi}_1(k) \hat{y}_1^T(k) - \Gamma \|I - \alpha_1 \hat{\phi}_1(k) \hat{\phi}_1^T(k)\| \hat{W}_1(k), \quad (3.59)$$

$$\hat{W}_2(k+1) = \hat{W}_2(k) - \alpha_2 \hat{\phi}_2(k) \hat{y}_2^T(k) - \Gamma \|I - \alpha_2 \hat{\phi}_2(k) \hat{\phi}_2^T(k)\| \hat{W}_2(k), \quad (3.60)$$

and the modified weight update for the output layer by either:

a) $\hat{W}_3(k+1) = \hat{W}_3(k) - \alpha_3 \hat{\phi}_3(k) \hat{f}^T(k) - \Gamma \|I - \alpha_3 \hat{\phi}_3(k) \hat{\phi}_3^T(k)\| \hat{W}_3(k), \quad (3.61)$ or b) $\hat{W}_3(k+1) = \hat{W}_3(k) - \alpha_3 \hat{\phi}_3(k) r^T(k+1) - \Gamma \|I - \alpha_3 \hat{\phi}_3(k) \hat{\phi}_3^T(k)\| \hat{W}_3(k), \quad (3.62)$ with $\Gamma > 0$ a design parameter. Then, the filtered tracking error $r(k)$ and the NN weight estimates $\hat{W}_1(k)$, $\hat{W}_2(k)$, and $\hat{W}_3(k)$ are GUUB provided the following conditions hold:

$$(1) \ \alpha_i \varphi_{i\max}^2 < 2, \forall i = 1, 2, \quad (3.63)$$

$$< 1, i = 3,$$

$$(2) \ 0 < \Gamma < 1, \quad (3.64)$$

$$(3) \ k_{v\max} < \frac{1}{\sqrt{\eta}} \quad (3.65)$$

for algorithm (a) and $$k_{v\max} < \frac{1}{\sqrt{\sigma}}$$

for algorithm (b)
where η is given in (3.18) for algorithm (a) and σ for algorithm (b) is given by $$\sigma = \frac{1}{\eta}[1 + \Gamma^2 \|I - \alpha_3 \hat{\phi}_3(k) \hat{\phi}_3^T(k)\|^2 + 2\alpha_3 \Gamma \hat{\varphi}_{3\max}^2 \|I - \alpha_3 \hat{\phi}_3(k) \hat{\phi}_3^T(k)\|] \quad (3.66)$$

where η in (3.66) given in (3.19).

Remarks: No PE condition is needed with the modified tuning algorithms.

Proof:

Algorithm (a): Select the Lyapunov function candidate (3.20). Use the tuning mechanism (3.59) through (3.61) in (3.21) to obtain $$\Delta J \leq -[1-\eta k_{vmax}^2]\|r(k)\|^2 + 2k_{vmax}\gamma\|r(k)\| + \rho - \sum_{i=1}^{2}[2-\alpha_i\hat{\varphi}_i^T(k)\hat{\varphi}_i(k)] \quad (3.67)$$

$$\left\|\tilde{W}_i^T(k)\hat{\varphi}_i(k) - \frac{[(1-\alpha_i\hat{\varphi}_i^T(k)\hat{\varphi}_i(k))-\Gamma\|I-\alpha_i\hat{\varphi}_i(k)\hat{\varphi}_i^T(k)\|]}{[2-\alpha_i\hat{\varphi}_i^T(k)\hat{\varphi}_i(k)]}W_i^T\hat{\varphi}_i(k)\right\|^2 - [1-$$

$$\alpha_3\hat{\varphi}_3^T(k)\hat{\varphi}_3(k)]$$

$$\left\|e_i(k) - \frac{[k_v r(k) + (\alpha_3\hat{\varphi}_3^T(k)\hat{\varphi}_3(k) + \Gamma\|I-\alpha_3\hat{\varphi}_3(k)\hat{\varphi}_3^T(k)\|)(W_3^T\tilde{\varphi}_3(k) + \varepsilon(k) + d(k))]}{[1-\alpha_3\hat{\varphi}_3^T(k)\hat{\varphi}_3(k)]}\right\|^2$$

$$+ \sum_{i=1}^{3}\frac{1}{\alpha_i}\|I-\alpha_i\hat{\varphi}_i(k)\hat{\varphi}_i^T(k)\|^2 tr\left[\Gamma^2\hat{W}_i^T(k)\hat{W}_i(k) + 2\Gamma\hat{W}_i^T(k)\tilde{W}_i^T(k)\right]$$

where $$\gamma = \left[1 + \frac{(\alpha_3\varphi_{3max}^2 + \Gamma\|I-\alpha_3\hat{\varphi}_3(k)\hat{\varphi}_3^T(k)\|)}{[1-\alpha_3\varphi_{3max}^2]}[W_{3max}\tilde{\varphi}_{3max} + \varepsilon_N + d_M]\right], \quad (3.68)$$

and $$\rho = \left[1 + \alpha_3\varphi_{3max}^2 + \frac{(\alpha_3\varphi_{3max}^2 + \Gamma\|I-\alpha_3\hat{\varphi}_3(k)\hat{\varphi}_3^T(k)\|)^2}{[1-\alpha_3\varphi_{3max}^2]}\right][W_{3max}\tilde{\varphi}_{3max} + \varepsilon_N + d_M]^2 + \quad (3.69)$$

$$2\Gamma W_{3max}\tilde{\varphi}_{3max}\|I-\alpha_3\hat{\varphi}_3(k)\hat{\varphi}_3^T(k)\|[W_{3max}\tilde{\varphi}_{3max} + \varepsilon_N + d_M] +$$

$$\sum_{i=1}^{2}\left[(\alpha_i\varphi_{imax}^2 + 2\Gamma\|I-\alpha_i\hat{\varphi}_i(k)\hat{\varphi}_i^T(k)\|) + \right.$$

$$\left.\frac{[(1-\alpha_i\varphi_{imax}^2)-\Gamma\|I-\alpha_i\hat{\varphi}_i(k)\hat{\varphi}_i^T(k)\|]^2}{(2-\alpha_i\varphi_{imax}^2)}\right]\varphi_{imax}^2 W_{imax}^2.$$

Consider (3.67), rewrite the last term in terms of $\|\tilde{Z}(k)\|$, denote the positive constants $c_{max}$ and $c_{min}$ as the maximum and minimum singular value of the diagonal matrix given by $$\begin{bmatrix} \frac{1}{\alpha_1}\|I-\alpha_1\hat{\varphi}_1(k)\hat{\varphi}_1^T(k)\| & 0 & 0 \\ 0 & \frac{1}{\alpha_2}\|I-\alpha_2\hat{\varphi}_2(k)\hat{\varphi}_2^T(k)\| & 0 \\ 0 & 0 & \frac{1}{\alpha_3}\|I-\alpha_3\hat{\varphi}_3(k)\hat{\varphi}_3^T(k)\| \end{bmatrix} \quad (3.70)$$

and complete the squares for $\|\tilde{Z}(k)\|$ to obtain $$\Delta J \leq -[1-\eta k_{vmax}^2]\left[\|r(k)\|^2 - \frac{2\gamma k_{vmax}}{[1-\eta k_{vmax}^2]}\|r(k)\| - \frac{(\rho + c_0 Z_{max}^2)}{[1-\eta k_{vmax}^2]}\right] - \quad (3.71)$$

$$\sum_{i=1}^{2}[2-\alpha_i\hat{\varphi}_i^T(k)\hat{\varphi}_i(k)]\left\|\tilde{W}_i^T(k)\hat{\varphi}_i(k) - \frac{[(1-\alpha_i\hat{\varphi}_i^T(k)\hat{\varphi}_i(k))-\Gamma\|I-\alpha_i\hat{\varphi}_i(k)\hat{\varphi}_i^T(k)\|]}{[2-\alpha_i\hat{\varphi}_i^T(k)\hat{\varphi}_i(k)]}W_i^T\hat{\varphi}_i(k)\right\|^2 - [1-$$

$$\alpha_3\hat{\varphi}_3^T(k)\hat{\varphi}_3(k)]\left\|e_i(k) - \frac{[k_v r(k) + (\alpha_3\hat{\varphi}_3^T(k)\hat{\varphi}_3(k) + \Gamma\|I-\alpha_3\hat{\varphi}_3(k)\hat{\varphi}_3^T(k)\|)(W_3^T\tilde{\varphi}_3(k) + \varepsilon(k) + d(k))]}{[1-\alpha_3\hat{\varphi}_3^T(k)\hat{\varphi}_3(k)]}\right\|^2 -$$

$$\Gamma(2-\Gamma)c_{min}\left[\|\tilde{Z}(k)\| - \frac{(1-\Gamma)}{(2-\Gamma)}\frac{c_{max}}{c_{min}}Z_{max}\right]^2,$$

with $$c_0 = \frac{c_{max}}{c_{min}}\frac{1}{(2-\Gamma)}[(1-\Gamma)^2 c_{max} + \Gamma^2(2-\Gamma)c_{min}]. \quad (3.72)$$

Then $\Delta J \leq 0$ as long as (3.63) through (3.65) hold and the quadratic term for r(k) in (3.71) is positive, which is guaranteed when $$\|r(k)\| > \frac{1}{(1-\eta k_{v\max}^2)}\left[\gamma k_{v\max} + \sqrt{\gamma^2 k_{v\max}^2 + [\rho + c_0 Z_{\max}^2](1-\eta k_{v\max}^2)}\right]. \quad (3.73)$$

Similarly, completing the squares for $\|r(k)\|$ using (3.67) yields $$\Delta J \leq -[1-\eta k_{v\max}^2]\left[\|r(k)\| - \frac{\gamma k_{v\max}}{[1-\eta k_{v\max}^2]}\right]^2 - \Gamma(2-\Gamma)c_{\min}\|\tilde{Z}(k)\|^2 - \quad (3.74)$$

$$2(1-\Gamma)c_{\max}\|\tilde{Z}(k)\|Z_{\max} - \left(\Gamma c_{\max}Z_{\max}^2 + \frac{\gamma^2 k_{v\max}^2}{(1-\eta k_{v\max}^2)} + \rho\right)\right] - \sum_{i=1}^{2}[2-$$

$$\alpha_i \hat{\varphi}_i^T(k)\hat{\varphi}_i(k)]\left\|\tilde{W}_i^T(k)\hat{\varphi}_i(k) - \frac{[(1-\alpha_i\hat{\varphi}_i^T(k)\hat{\varphi}_i(k)) - \Gamma\|I-\alpha_i\hat{\varphi}_i(k)\hat{\varphi}_i^T(k)\|]}{[2-\alpha_i\hat{\varphi}_i^T(k)\hat{\varphi}_i(k)]}W_i^T\hat{\varphi}_i(k)\right\|^2 - [1-$$

$$\alpha_3 \hat{\varphi}_3^T(k)\hat{\varphi}_3(k)]\left\|e_i(k) - \frac{[k_v r(k) + (\alpha_3 \hat{\varphi}_3^T(k)\hat{\varphi}_3(k) + \Gamma\|I-\alpha_3\hat{\varphi}_3(k)\hat{\varphi}_3^T(k)\|)(W_3^T \tilde{\varphi}_3(k) + \varepsilon(k) + d(k))]}{[1-\alpha_3\hat{\varphi}_3^T(k)\hat{\varphi}_3(k)]}\right\|^2,$$

where $\lambda$ and $\rho$ are given in (3.68) and (3.69) respectively. Then $\Delta J \leq 0$ as long as (3.63) through (3.65) hold and the quadratic term for $\|\tilde{Z}(k)\|$ in (3.74) is positive, which is guaranteed when $$\|\tilde{Z}(k)\| > \frac{\Gamma(1-\Gamma)c_{\max}Z_{\max} + \sqrt{\Gamma^2(1-\Gamma)^2 c_{\max}Z_{\max}^2 + \Gamma(2-\Gamma)c_{\min}\theta}}{\Gamma(2-\Gamma)} \quad (3.75)$$

where $$\theta = \left[\Gamma^2 c_{\max}Z_{\max}^2 + \frac{\gamma^2 k_{v\max}^2}{(1-\eta k_{v\max}^2)} + \rho\right]. \quad (3.76)$$

From (3.73) and (3.75), it can be concluded that the tracking error r(k) and the error in weight estimates $\tilde{Z}(k)$ are GUUB. Algorithm (b): Select the Lyapunov function candidate (3.20). Use the tuning mechanism (3.59), (3.60) and (3.62) to obtain $$\Delta J \leq -(1-\eta k_{v\max}^2)\|r(k)\|^2 + 2\gamma k_{v\max}\|r(k)\| + \rho - \quad (3.77)$$

$$\sum_{i=1}^{2}[2-\alpha_i\hat{\varphi}_i^T(k)\hat{\varphi}_i(k)]\left\|\tilde{W}_i^T(k)\hat{\varphi}_i(k) - \frac{[(1-\alpha_i\hat{\varphi}_i^T(k)\hat{\varphi}_i(k)) - \Gamma\|I-\alpha_i\hat{\varphi}_i(k)\hat{\varphi}_i^T(k)\|]}{[2-\alpha_i\hat{\varphi}_i^T(k)\hat{\varphi}_i(k)]}W_i^T\hat{\varphi}_i(k)\right\|^2 - [1-$$

$$\alpha_3\hat{\varphi}_3^T(k)\hat{\varphi}_3(k)]\left\|e_i(k) - \frac{[\alpha_3\hat{\varphi}_3^T(k)\hat{\varphi}_3(k) + \Gamma\|I-\alpha_3\hat{\varphi}_3(k)\hat{\varphi}_3^T(k)\|](k_v r(k) + (W_3^T \tilde{\varphi}_3(k) + \varepsilon(k) + d(k)))}{[1-\alpha_3\hat{\varphi}_3^T(k)\hat{\varphi}_3(k)]}\right\|^2,$$

$$+ \sum_{i=1}^{3}\frac{1}{\alpha_i}\|I-\alpha_i\hat{\varphi}_i(k)\hat{\varphi}_i^T(k)\|^2 tr\left[\Gamma^2 \hat{W}_i^T(k)\hat{W}_i(k) + 2\Gamma \hat{W}_i^T(k)\tilde{W}_i(k)\right],$$

where $$\gamma = \eta(W_{3\max}\tilde{\varphi}_{3\max} + \varepsilon_N + d_M) + \Gamma\|I-\alpha_3\hat{\varphi}_3(k)\hat{\varphi}_3^T(k)\|\varphi_{3\max}W_{3\max}, \quad (3.78)$$

and $$\rho = [\eta(W_{3\max}\tilde{\varphi}_{3\max} + \varepsilon_N + d_M) + 2\Gamma\|I-\alpha_3\hat{\varphi}_3(k)\hat{\varphi}_3^T(k)\|\varphi_{3\max}W_{3\max}](W_{3\max}\tilde{\varphi}_{3\max} + \varepsilon_N + d_M) + \quad (3.79)$$

$$\sum_{i=1}^{2}\left[(\alpha_i\varphi_{i\max}^2 + 2\Gamma\|I-\alpha_i\hat{\varphi}_i(k)\hat{\varphi}_i^T(k)\|) + \frac{[(1-\alpha_i\varphi_{i\max}^2) - \Gamma\|I-\alpha_i\hat{\varphi}_i(k)\hat{\varphi}_i^T(k)\|]^2}{[2-\alpha_i\varphi_{i\max}^2]}\right]\varphi_{i\max}^2 W_{i\max}^2.$$

Completing the squares for $\|\tilde{Z}(k)\|$ in (3.77) similar to algorithm (a) results in $\Delta J \leq 0$ as long as the conditions in (3.63) through (3.65) are satisfied and with the upper bound on the tracking error given by $$\|r(k)\| > \frac{1}{(1-\eta k_{vmax}^2)}\left[\gamma k_{vmax} + \sqrt{\gamma^2 k_{vmax}^2 + [\rho + c_0 Z_{max}^2](1-\eta k_{vmax}^2)}\right]. \quad (3.80)$$

On the other hand, completing the squares for $\|r(k)\|$ in (3.77) results in $\Delta J \leq 0$ as long as the conditions (3.63) through (3.65) are satisfied and $$\|\tilde{Z}(k)\| > \frac{\Gamma(1-\Gamma)c_{max}Z_{max} + \sqrt{\Gamma^2(1-\Gamma)^2 c_{max}Z_{max}^2 + \Gamma(2-\Gamma)c_{min}\theta}}{\Gamma(2-\Gamma)},$$

where $$\theta = \left[\Gamma^2 c_{max} Z_{max}^2 + \frac{\gamma^2 k_{vmax}^2}{(1-\eta k_{vmax}^2)} + \rho\right].$$

In general $\Delta J \leq 0$ as long as (3.63) through (3.65) are satisfied and either (3.80) or (3.81) holds. This demonstrates that the tracking error and the error in weight estimates are GUUB.

Note that the NN reconstruction error bound $\epsilon_N$ and the bounded disturbances $d_M$ increase the bounds on $\|r(k)\|$ and $\|\tilde{Z}(k)\|$ in a very interesting way. Note that small tracking error bounds, but not arbitrarily small, may be achieved by placing the closed-loop poles inside the unit circle and near the origin through the selection of the largest eigenvalue, $k_{vmax}$. On the other hand, the NN weight error estimates are fundamentally bounded by $Z_{max}$, the known bound on the ideal weights W. The parameter $\Gamma$ offers a design tradeoff between the relative eventual magnitudes of $\|r(k)\|$ and $\|\tilde{Z}(k)\|$; a smaller $\Gamma$ yields a smaller $\|r(k)\|$ and a larger $\|\tilde{Z}(k)\|$, and vice versa.

The effect of adaptation gains $\alpha_1$, $\alpha_2$, and $\alpha_3$ at each layer on the weight estimation error $\tilde{Z}(k)$, and tracking error $r(k)$, can be easily observed by using the bounds presented in (3.80) and (3.81) through $c_{min}$ and $c_{max}$. Large values of $\alpha_1$, and $\alpha_2$ forces smaller weight estimation error whereas the tracking error is unaffected. In contrast, a large value of $\alpha_3$ forces smaller tracking and weight estimation errors. The next corollary, by using the improved weight tuning updates, extends the stability analysis presented for a three-layer NN in Theorem 3.5 to an n-layer NN.

Corollary 3.6

Assume the same hypotheses as Theorem 3.5, and consider the modified weight tuning algorithms provided for the input and hidden layers as $$\hat{W}_1(k+1) = \hat{W}_1(k) - \alpha_1 \hat{\phi}_1(k)\hat{y}_1^T(k) - \Gamma\|I - \alpha_1 \hat{\phi}_1(k)\hat{\phi}_1^T(k)\|\hat{W}_1(k), \forall i=1,\ldots, n-1, \quad (3.83)$$

and the modified weight update for the output layer is given by either a) $\hat{W}_n(k+1) = \hat{W}_n(k) + \alpha_n \hat{\phi}_n(k)\bar{f}^T(k) - \Gamma\|I - \alpha_n \hat{\phi}_n(k)\hat{\phi}_n^T(k)\|\hat{W}_n(k), \quad (3.84)$ or b) $\hat{W}_n(k-1) = \hat{W}_n(k) + \alpha_n \hat{\phi}_n(k)r^T(k+1) - \Gamma\|I - \alpha_n \hat{\phi}_n(k)\hat{\phi}_n^T(k)\|\hat{W}_n(k), (3.85)$ with $\Gamma > 0$ a design parameter. Then, the filtered tracking error $r(k)$ and the NN weight estimates $\hat{W}_i(k); \forall i=1,\ldots, n$ (3.81)

(3.82)

are GUUB provided the following conditions hold:

(1) $\alpha_i \varphi_{imax}^2 < 2, \forall i=1,\ldots, n-1,$ (3.86)

$< 1, i = n,$ (2) $0 < \Gamma < 1,$ (3.87)

(3) $k_{vmax} < \frac{1}{\sqrt{\eta}}$ (3.88)

for algorithm (a) and $$k_{vmax} < \frac{1}{\sqrt{\sigma}}$$

for algorithm (b)
where $\eta$ is given in (3.39) for algorithm (a) and $\sigma$ for algorithm (b) is given by $$\sigma = \frac{1}{\eta}\left[1 + \Gamma^2\|I - \alpha_n \hat{\phi}_n(k)\hat{\varphi}_n^T(k)\|^2 + 2\alpha_3 \Gamma \varphi_{nmax}^2\|I - \alpha_3 \hat{\phi}_n(k)\hat{\varphi}_n^T(k)\|\right] \quad (3.89)$$

with $\eta$ in (3.89) given in (3.40).

Remarks: No PE condition is needed with the modified tuning algorithms.

Proof:

Algorithm (a): Select the Lyapunov function candidate (3.43). Considering the input and hidden (3.83), output (3.84) weight updates as well as the tracking error dynamics (3.41), using these in (3.44), and completing the squares for $\|\tilde{Z}(k)\|$, one may obtain $$\Delta J \leq -[1-\eta k_{vmax}^2]\left[\|r(k)\|^2 - \frac{2\gamma k_{vmax}}{[1-\eta k_{vmax}^2]}\|r(k)\| - \frac{(\rho + c_0 Z_{max}^2)}{[1-\eta k_{vmax}^2]}\right] - \quad (3.90)$$

$$\sum_{i=1}^{n-1}[2-\alpha_i\hat{\varphi}_i^T(k)\hat{\varphi}_i(k)]\left\|\tilde{W}_i^T(k)\hat{\varphi}_i(k) - \frac{[(1-\alpha_i\hat{\varphi}_i^T(k)\hat{\varphi}_i(k)) - \Gamma\|I-\alpha_i\hat{\varphi}_i(k)\hat{\varphi}_i^T(k)\|]}{[2-\alpha_i\hat{\varphi}_i^T(k)\hat{\varphi}_i(k)]}W_i^T\hat{\varphi}_i(k)\right\|^2 - [1-\alpha_n\hat{\varphi}_n^T(k)\hat{\varphi}_n(k)]$$

$$\left\|e_i(k) - \frac{[k_v r(k) + (\alpha_n\hat{\varphi}_n^T(k)\hat{\varphi}_n(k) + \Gamma\|I-\alpha_n\hat{\varphi}_n(k)\hat{\varphi}_n^T(k)\|)(W_n^T\tilde{\varphi}_n(k) + \varepsilon(k) + d(k))]}{[1-\alpha_n\hat{\varphi}_n^T(k)\hat{\varphi}_n(k)]}\right\|^2,$$

$$-\Gamma(2-\Gamma)c_{min}\left[\|\tilde{Z}(k)\| - \frac{(1-\Gamma)}{(2-\Gamma)}\frac{c_{max}}{c_{min}}Z_{max}\right]^2,$$

where $$\gamma = \left[1 + \frac{(\alpha_n\varphi_{nmax}^2 + \Gamma\|I-\alpha_n\hat{\varphi}_n(k)\hat{\varphi}_n^T(k)\|)}{[1-\alpha_n\varphi_{nmax}^2]}[W_{nmax}\tilde{\varphi}_{nmax} + \varepsilon_N + d_M]\right], \quad (3.91)$$

and $$\rho = \left[1 + \alpha_n\varphi_{nmax}^2 + \frac{(\alpha_n\varphi_{nmax}^2 + \Gamma\|I-\alpha_n\hat{\varphi}_n(k)\hat{\varphi}_n^T(k)\|)^2}{[1-\alpha_n\varphi_{nmax}^2]}\right][W_{nmax}\tilde{\varphi}_{nmax} + \varepsilon_N + d_M]^2 + \quad (3.92)$$

$$2\Gamma W_{nmax}\tilde{\varphi}_{nmax}\|I-\alpha_n\hat{\varphi}_n(k)\hat{\varphi}_n^T(k)\|[W_{nmax}\tilde{\varphi}_{nmax} + \varepsilon_N + d_M] +$$

$$\sum_{i=1}^{n-1}\left[(\alpha_i\varphi_{imax}^2 + 2\Gamma\|I-\alpha_i\hat{\varphi}_i(k)\hat{\varphi}_i^T(k)\|) + \frac{[(1-\alpha_i\varphi_{imax}^2) - \Gamma\|I-\alpha_i\hat{\varphi}_i(k)\hat{\varphi}_i^T(k)\|]^2}{[2-\alpha_i\varphi_{imax}^2]}\right]\varphi_{imax}^2 W_{imax}^2.$$

Then $\Delta J \leq 0$ as long as (3.86) through (3.88) hold and the quadratic term for $r(k)$ in (3.90) is positive, which is guaranteed when (3.73) is satisfied with $\lambda$ $\rho$ in (3.90) are given in (3.91) and (3.92) respectively.

Similarly completing the squares for $\|r(k)\|$ in (3.90), the first difference is $$\Delta J \leq -[1-\eta k_{vmax}^2]\left[\|r(k)\| - \frac{\gamma k_{vmax}}{[1-\eta k_{vmax}^2]}\right]^2 - \quad (3.93)$$

$$\Gamma\left[(2-\Gamma)c_{min}\|\tilde{Z}(k)\|^2 - 2(1-\Gamma)c_{max}\|\tilde{Z}(k)\|Z_{max} - \left(\Gamma c_{max}Z_{max}^2 + \frac{\gamma^2 k_{vmax}^2}{(1-\eta k_{vmax}^2)} + \rho\right)\right] -$$

$$\sum_{i=1}^{n-1}[2-\alpha_i\hat{\varphi}_i^T(k)\hat{\varphi}_i(k)]\left\|\tilde{W}_i^T(k)\hat{\varphi}_i(k) - \right.$$

$$\left.\frac{[(1-\alpha_i\hat{\varphi}_i^T(k)\hat{\varphi}_i(k)) - \Gamma\|I-\alpha_i\hat{\varphi}_i(k)\hat{\varphi}_i^T(k)\|]}{[2-\alpha_i\hat{\varphi}_i^T(k)\hat{\varphi}_i(k)]}W_i^T\hat{\varphi}_i(k)\right\|^2 - [1-$$

$$\alpha_n\hat{\varphi}_n^T(k)\hat{\varphi}_n(k)]\left\|e_i(k) - \right.$$

$$\left.\frac{[k_v r(k) + (\alpha_n\hat{\varphi}_n^T(k)\hat{\varphi}_n(k) + \Gamma\|I-\alpha_n\hat{\varphi}_n(k)\hat{\varphi}_n^T(k)\|)(W_n^T\tilde{\varphi}_n(k) + \varepsilon(k) + d(k))]}{[1-\alpha_n\hat{\varphi}_n^T(k)\hat{\varphi}_n(k)]}\right\|^2,$$

where $\rho$ is given in (3.92). Then $\Delta J \leq 0$ as long as (3.86) through (3.88) hold and the quadratic term for $\|\tilde{Z}(k)\|$ in (3.93) is positive, which is guaranteed when (3.75) is satisfied. This demonstrates that the tracking error $r(k)$ and the error in weight estimates $\tilde{Z}(k)$ are GUUB.

Algorithm (b): Select the Lyapunov function candidate (3.43). The first difference is given by using (3.83), (3.85) and (3.41) as $$\Delta J \le -(1-\eta k_{vmax}^2)\|r(k)\|^2 + 2\gamma k_{vmax}\|r(k)\| + \rho - \sum_{i=1}^{n-1}[2-\alpha_i\hat{\varphi}_i^T(k)\hat{\varphi}_i(k)]\left\|\tilde{W}_i^T(k)\hat{\varphi}_i(k) - \right.$$ (3.94)

$$\left. \frac{[(1-\alpha_i\hat{\varphi}_i^T(k)\hat{\varphi}_i(k)) - \Gamma\|I - \alpha_i\hat{\varphi}_i(k)\hat{\varphi}_i^T(k)\|]}{[2-\alpha_i\hat{\varphi}_i^T(k)\hat{\varphi}_i(k)]}W_i^T\hat{\varphi}_i(k)\right\|^2 - [1-\alpha_n\hat{\varphi}_n^T(k)\hat{\varphi}_n(k)]$$

$$\left\|e_i(k) - \frac{[(\alpha_n\hat{\varphi}_n^T(k)\hat{\varphi}_n(k) + \Gamma\|I - \alpha_n\hat{\varphi}_n(k)\hat{\varphi}_n^T(k)\|])(k_vr(k) + W_n^T\tilde{\varphi}_n(k) + \varepsilon(k) + d(k))]}{[1-\alpha_n\hat{\varphi}_n^T(k)\hat{\varphi}_n(k)]}\right\|^2,$$

$$+ \sum_{i=1}^n \frac{1}{\alpha_i}\|I - \alpha_i\hat{\varphi}_i(k)\hat{\varphi}_i^T(k)\|^2 tr\left[\Gamma^2\hat{W}_i^T(k)\hat{W}_i(k) + 2\Gamma\hat{W}_i^T(k)\tilde{W}_i^T(k)\right],$$

where $$\gamma = \eta(W_{nmax}\tilde{\varphi}_{nmax} + \varepsilon_N + d_M) + \Gamma\|I - \alpha_n\hat{\varphi}_n(k)\hat{\varphi}_n^T(k)\|\varphi_{nmax}W_{nmax},$$ (3.95)

and $$\rho = [\eta(W_{nmax}\tilde{\varphi}_{nmax} + \varepsilon_N + d_M) + 2\Gamma\|I - \alpha_n\hat{\varphi}_n(k)\hat{\varphi}_n^T(k)\|\varphi_{nmax}W_{nmax}](W_{nmax}\tilde{\varphi}_{nmax} + \varepsilon_N + d_M) +$$ (3.96)

$$\sum_{i=1}^{n-1}\left[(\alpha_i\varphi_{imax}^2 + 2\Gamma\|I - \alpha_i\hat{\varphi}_i(k)\hat{\varphi}_i^T(k)\|) + \frac{[(1-\alpha_i\varphi_{imax}^2) - \Gamma\|I - \alpha_i\hat{\varphi}_i(k)\hat{\varphi}_i^T(k)\|]^2}{[2-\alpha_i\varphi_{imax}^2]}\right]\varphi_{imax}^2 W_{imax}^2.$$

Proof follows similarly to that of algorithm (a).

4. Passivity Properties of the NN

Figure 3:
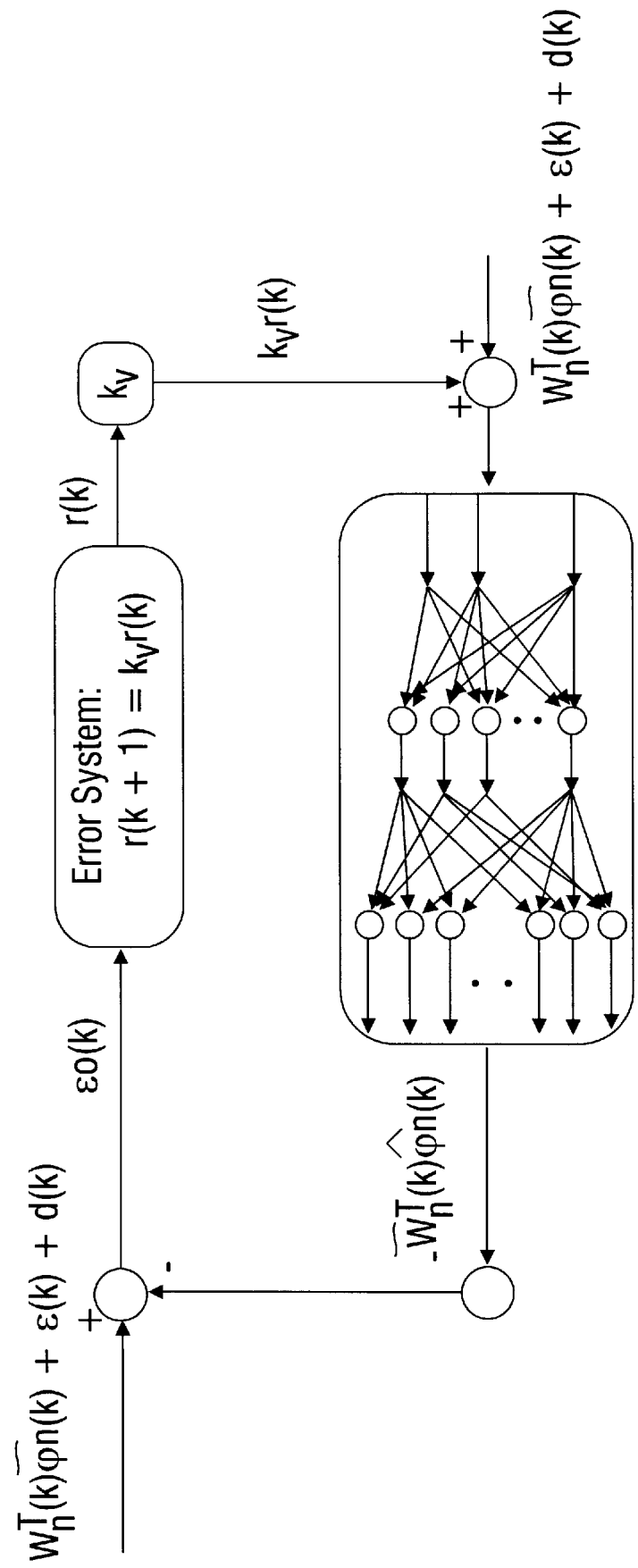
FIG. 3 is a block diagram of a closed-loop error system.
Figure 4A:
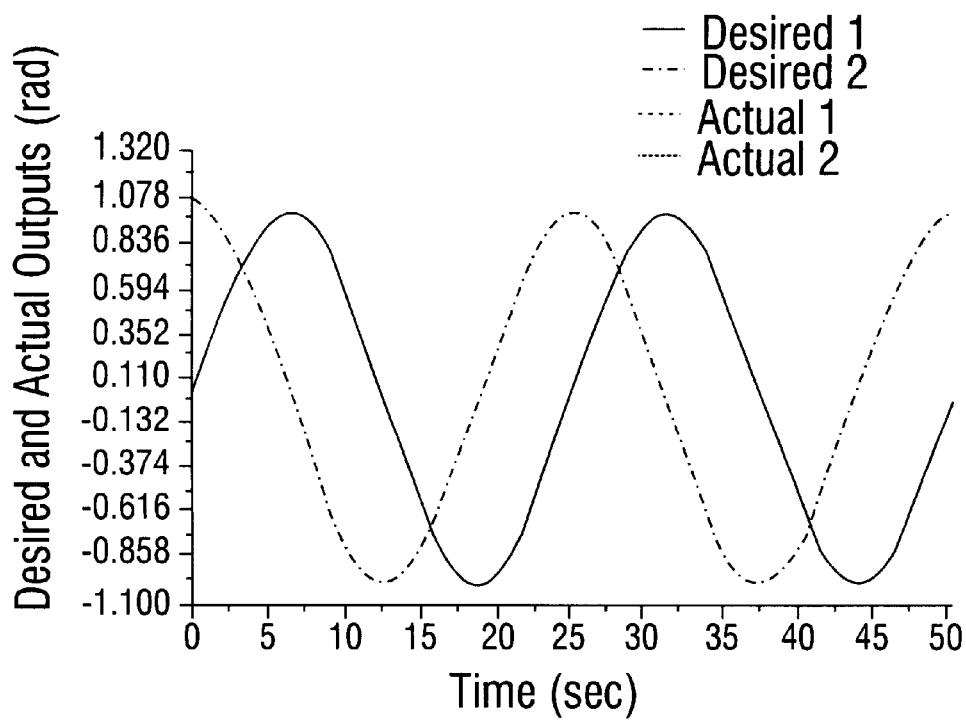
FIGS. 4A and 4B show tracking response of a neural network controller of the present invention with delta rule.
Figure 4B:
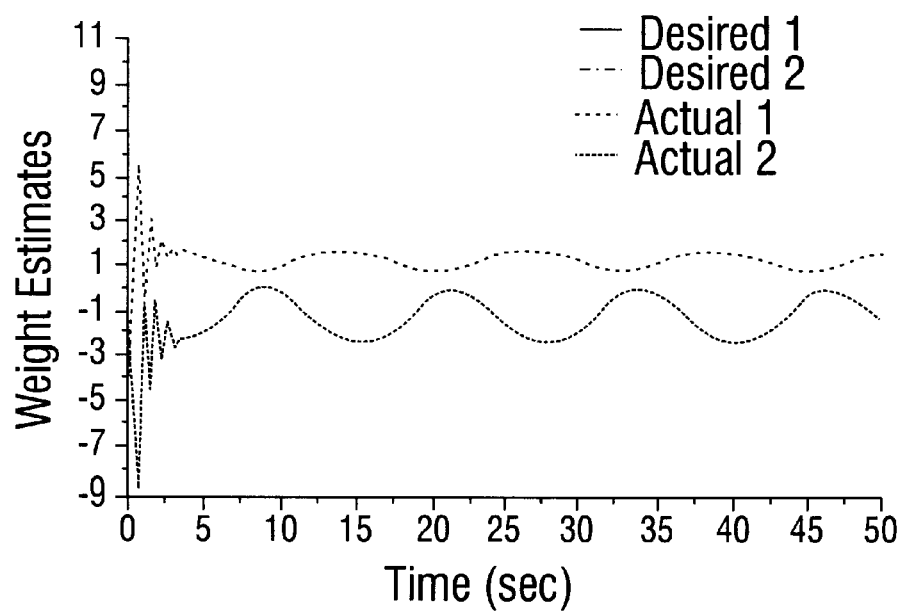
Figure 5A:
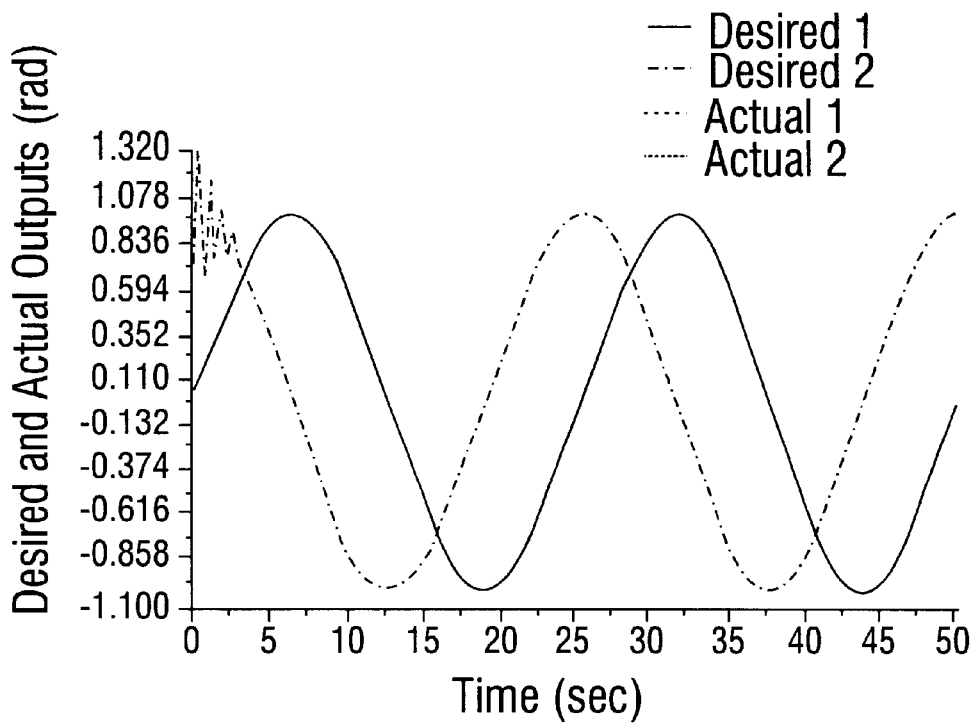
Figure 5B:
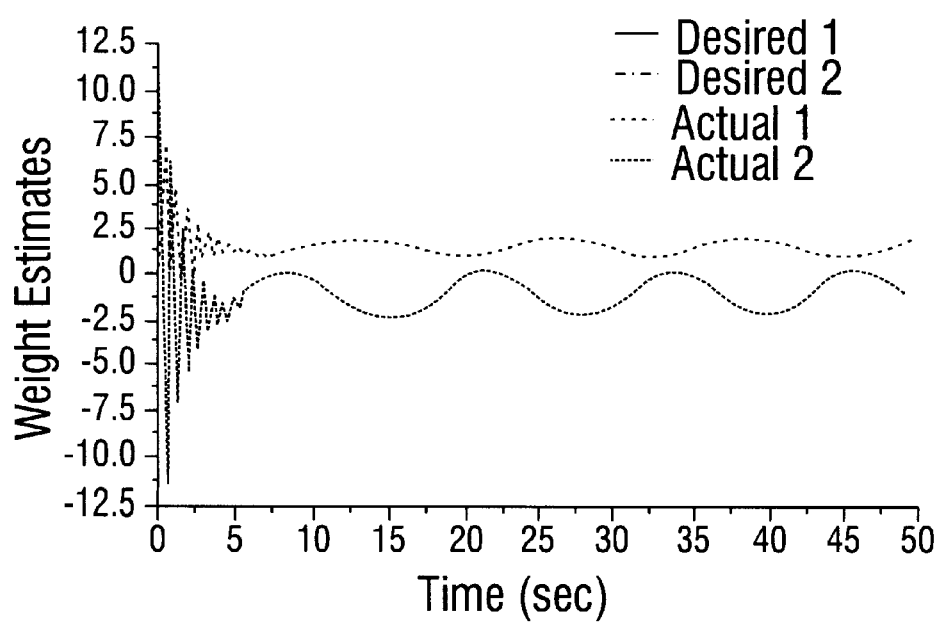

The closed-loop error system (3.7) is shown in FIG. 3, for instance when (3.36) is employed (the structure for (3.35) is the same); note that the NN now is in the standard feedback configuration as opposed to the NN controller in FIG. 2. Passivity is essential in a closed-loop system as it guarantees the boundedness of signals, and hence suitable performance, even in the presence of additional unforeseen bounded disturbances (i.e., NN robustness). Therefore, in this section the passivity properties of the multilayer NN, and hence of the closed-loop system, are explored for various weight tuning algorithms. Note the input and the hidden layer weight update laws employed for algorithms (a) and (b) are same.

Theorem 4.1

(i) The weight tuning algorithms (3.10) and (3.11) make the map from $W_1^T$ to $\tilde{W}_1^T$, and $W_2^T$ to $\tilde{W}_2^T$, both passive maps.

(ii) The weight tuning algorithms (3.13), (3.14) make the map from, $(W_3^T\phi_3(k)+\epsilon(k)+d(k))$ for the case of algorithm (a), and $(k_vr(k)+W_3^T\phi_3(k)+\epsilon(k)+d(k))$ for the case of algorithm (b), to $-\tilde{W}_3^T(k)\hat{\phi}_3(k)$ a passive map.

Proof:

(i) Define a Lyapunov function candidate $$J = \frac{1}{\alpha_1}tr\left[\tilde{W}_1^T(k)\tilde{W}_1(k)\right],$$ (4.1)

where first difference is given by $$\Delta J = \frac{1}{\alpha_1}tr\left[\tilde{W}_1^T(k+1)\tilde{W}_1(k+1) - \tilde{W}_1^T(k)\tilde{W}_1(k)\right].$$ (4.2)

Submitting the weight update law (3.10) in (4.2) to obtain $$\Delta J = -(2-\alpha_1\hat{\phi}_1^T(k)\hat{\phi}_1(k)(\\ \tilde{W}_1^T(k)\hat{\phi}_1(k))^T(\tilde{W}_1^T(k)\hat{\phi}_1(k))+2(1-\alpha_1\hat{\phi}_1^T(k)\hat{\phi}_1(k))\\ (\tilde{W}_1^T(k)\hat{\phi}_1(k))^T(W_1^T(k)\hat{\phi}_1(k))+\\ \alpha_1(\hat{\phi}_1^T(k)\hat{\phi}_1(k))(W_1^T(k)\hat{\phi}_1(k))^T(W_1^T(k)\hat{\phi}_1(k))$$ (4.3)

Note (4.3) is in power form (2.11) as long as the condition (3.16) holds. This demonstrates the passivity of the update law (3.10).

Similarly, it can be shown by using the hidden layer update (3.11) that the weight tuning (3.11) is in fact a passive map.

(ii) Algorithm (a): Define a Lyapunov function candidate $$J = \frac{1}{\alpha_1}tr\left[\tilde{W}_3^T(k)\tilde{W}_3(k)\right],$$ (4.4)

whose first difference is given by $$J = \frac{1}{\alpha_3}tr\left[\tilde{W}_3^T(k+1)\tilde{W}_3(k+1) - \tilde{W}_3^T(k)\tilde{W}_3(k)\right].$$

Substituting the weight update law (3.13) in (4.5) yields $$\Delta J = -(2-\alpha_3\hat{\varphi}_3^T(k)\hat{\varphi}_3(k))\left(-\tilde{W}_3^T(k)\hat{\varphi}_3(k)\right)^T\left(-\tilde{W}_3^T(k)\hat{\varphi}_3(k)\right) +$$ (4.6)

$$2(1-\alpha_3\hat{\varphi}_3^T(k)\hat{\varphi}_3(k))\left(-\tilde{W}_3^T(k)\hat{\varphi}_3(k)\right)^T\left(\tilde{W}_3^T(k)\tilde{\varphi}_3(k) + \varepsilon(k) + d(k)\right) +$$

$$\alpha_3\hat{\varphi}_3^T(k)\hat{\varphi}_3(k)\left(\tilde{W}_3^T(k)\tilde{\varphi}_3(k) + \varepsilon(k) + d(k)\right)^T$$

$$\left(\tilde{W}_3^T(k)\tilde{\varphi}_3(k) + \varepsilon(k) + d(k)\right).$$

Note (4.6) is in power form (2.11) as long as the condition (3.16) holds. This in turn guarantees the passivity of the weight tuning mechanism (3.13).

Algorithm (b): Select the Lyapunov function candidate (4.4). Use (3.14) in (4.5) to obtain $$\Delta J = -(2 - \alpha_3 \hat{\varphi}_3^T(k)\hat{\varphi}_3(k))(-\tilde{W}_3^T(k)\hat{\varphi}_3(k))^T(-\tilde{W}_3^T(k)\hat{\varphi}_3(k)) + \quad (4.7)$$
$$2(1 - \alpha_3 \hat{\varphi}_3^T(k)\hat{\varphi}_3(k))(-\tilde{W}_3^T(k)\hat{\varphi}_3(k))^T$$
$$(k_v r(k) + \tilde{W}_3^T(k)\tilde{\varphi}_3(k) + \varepsilon(k) + d(k)) +$$
$$\alpha_3 \hat{\varphi}_3^T(k)\hat{\varphi}_3(k)(k_v r(k) + \tilde{W}_3^T(k)\tilde{\varphi}_3(k) + \varepsilon(k) + d(k))^T$$
$$(k_v r(k) + \tilde{W}_3^T(k)\tilde{\varphi}_3(k) + \varepsilon(k) + d(k)).$$

which is in power form (2.11) for discrete-time systems as long as the condition (3.16) holds.

The next result demonstrates the passivity properties for NN with an arbitrary number of hidden layers.

Corollary 4.2

(i) The weight tuning algorithms (3.33) for the input and hidden layers in a n-layer NN make the maps from $W_i^T$ to $\tilde{W}_i^T$ (k); $\forall i=1, \ldots, n-1$, passive maps (ii) The weight tuning algorithm (3.35), (3.36) make the map from, $(W_n^{T\phi}{}_n(k)+\epsilon(k)+d(k))$ for the case of algorithm (a), and $(k_v r(k)+W_n^T \phi_n(k)+\epsilon(k)+d(k))$ for the case of algorithm (b), to $-\tilde{W}_n^T(k)\hat{\phi}_n(k)$ a passive map, Proof:

(i) Define a Lyapunov function candidate $$J_i = \frac{1}{\alpha_1} tr[\tilde{W}_i^T(k)\tilde{W}_i(k)]; \; \forall \, i = 1, \ldots, n-1, \quad (4.8)$$

whose first difference is given by $$\Delta J_i = \frac{1}{\alpha_i} tr[\tilde{W}_i^T(k+1)\tilde{W}_i(k+1) - \tilde{W}_i^T(k)\tilde{W}_i(k)]; \; \forall \, i = 1, \ldots, n-1. \quad (4.9)$$

Substituting the weight update law (3.33) in (4.9) to obtain $$\Delta J_i = -(2-\alpha_i \hat{\phi}_i^T(k)\hat{\phi}_i(k)(\tilde{W}_i^T(k)\hat{\phi}_i(k))^T(\tilde{W}_i^T(k)\hat{\phi}_i(k))^T(\tilde{W}_i^T(k)\hat{\phi}_i(k))+2(1-\alpha_1 \phi_i^T(k)\phi_i(k))\;(\tilde{W}_i^T(k)\hat{\phi}_i(k))^T(W_i^T(k)\phi_i(k))+$$
$$\alpha_i(\hat{\phi}_i^T(k)\hat{\phi}_i(k))^T(W_i^T(k)\phi_i(k)); \; \forall i=1, \ldots, n-1. \quad (4.10)$$

Note (4.10) is in power form (2.11) as long as the condition (3.37) holds. This demonstrates the passivity of the update law (3.33) used for the input and hidden layers.

(ii) Algorithm (a): Define a Lyapunov function candidate $$J_n = \frac{1}{\alpha_n} tr[\tilde{W}_n^T(k)\tilde{W}_n(k)], \quad (4.11)$$

whose first difference is given by $$J_n = \frac{1}{\alpha_1} tr[\tilde{W}_n^T(k+1)\tilde{W}_n(k+1) - \tilde{W}_n^T(k)\tilde{W}_n(k)]. \quad (4.12)$$

$$\Delta J = -(2 - \alpha_n \hat{\varphi}_n^T(k)\hat{\varphi}_n(k))(-\tilde{W}_n^T(k)\hat{\varphi}_n(k))^T(-\tilde{W}_n^T(k)\hat{\varphi}_n(k)) + \quad (4.13)$$
$$2(1 - \alpha_n \hat{\varphi}_n^T(k)\hat{\varphi}_n(k))(-\tilde{W}_n^T(k)\hat{\varphi}_n(k))^T(\tilde{W}_n^T(k)\hat{\varphi}_n(k))^T + \alpha_n \hat{\varphi}_n^T(k)$$
$$\hat{\varphi}_n(k)(\tilde{W}_n^T(k)\tilde{\varphi}_n(k) + \varepsilon(k) + d(k))^T(\tilde{W}_n^T(k)\tilde{\varphi}_n(k) + \varepsilon(k) + d(k)).$$

Note (4.13) is in power form (2.11) as long as the condition (3.37) holds. This in turn guarantees the passivity of the weight tuning mechanism (3.35) for the output layer.

Algorithm (b): Select the Lyapunov function candidate (4.11). Use (3.36) in (4.12) to obtain $$\Delta J_n = -(2 - \alpha_n \hat{\varphi}_n^T(k)\hat{\varphi}_n(k))(-\tilde{W}_n^T(k)\hat{\varphi}_n(k))^T(-\tilde{W}_n^T(k)\hat{\varphi}_n(k)) + \quad (4.14)$$
$$2(1 - \alpha_n \hat{\varphi}_n^T(k)\hat{\varphi}_n(k))(-\tilde{W}_n^T(k)\hat{\varphi}_n(k))^T$$
$$(k_v r(k) + \tilde{W}_n^T(k)\tilde{\varphi}_n(k) + \varepsilon(k) + d(k)) +$$
$$\alpha_3 \hat{\varphi}_n^T(k)\hat{\varphi}_n(k)(k_v r(k) + \tilde{W}_n^T(k)\tilde{\varphi}_n(k) + \varepsilon(k) + d(k))^T$$
$$(k_v r(k) + \tilde{W}_n^T(k)\tilde{\varphi}_n(k) + \varepsilon(k) + d(k)).$$

which is in power form (2.12) for discrete-time systems as long as the condition (3.37) holds.

Thus, the weight error block is passive and the closed-loop filtered tracking error system (3.7) in FIG. 3 is dissipative (see Theorem 2.2); this guarantees the dissipativity of the closed-loop system [21]. By employing the passivity theorem [2.1], one can conclude that the input/output signals of each block are bounded as long as the external inputs are this does not yield boundedness of the internal states of the lower block (i.e., $\tilde{W}_1(k)$; $\forall i=1, \ldots, n$) unless PE holds.

The next Theorem shows why PE is not needed with the modified update algorithms of Theorem 3.5.

Theorem 4.3

(i) The modified weight tuning algorithms (3.59) and (3.60) make the map from $W_i^T$ to $\tilde{W}_i^T$ (k), and $W_2^T$ (k), both state strict passive maps.

(ii) The weight tuning mechanisms (3.61), (3.62) for a three-layer NN make the map from, $(W_3^T \phi_3(k)+\epsilon(k)+d(k))$ for the case of algorithm (a), and $(k_v r(k)+W_3^T \phi_3(k)+\epsilon(k)+d(k))$ for the case of algorithm (b), to $-\tilde{W}_3^T(k)\phi_3(k)$ a state strict passive map, Proof:

(i) The revised dynamics relative to input $\tilde{W}_1(k)$, and hidden layer, $\tilde{W}_2(k)$, error in weight estimates are given by $$\tilde{W}_1(k+1) = [I - \alpha_1$$
$$\phi_1^T(k)]\tilde{W}_1(k) + \alpha_1 \hat{\phi}_1(k)(W_1^T \hat{\phi}(k))^T + \Gamma\|I - \alpha_1 \hat{\phi}_1(k)\hat{\phi}_1^T(k)\|\hat{W}_1(k) \quad (4.15)$$

$$\tilde{W}_2(k+1) = [I - \alpha_2 \hat{\phi}_2^T(k)]\tilde{W}_2(k) + \alpha_2 \hat{\phi}_2(k)(W_2^T \hat{\phi}(k))^T + \Gamma\|I - \alpha_2 \hat{\phi}_2(k)\hat{\phi}_2^T(k)\|\hat{W}_2(k), \quad (4.16)$$

Select the Lyapunov function candidate (4.1) and use (4.15) in (4.2) to obtain $$\Delta J \leq -(2 - \alpha_1 \hat{\varphi}_1^T(k)\hat{\varphi}_1(k))(\tilde{W}_1^T(k)\hat{\varphi}_1(k))^T(\tilde{W}_1^T(k)\hat{\varphi}_1(k)) + \quad (4.17)$$
$$2[(1 - \alpha_1 \hat{\varphi}_1^T(k)\hat{\varphi}_1(k)) - \Gamma\|I - \alpha_1 \hat{\varphi}_1(k)\hat{\varphi}_1^T(k)\|]$$
$$(\tilde{W}_1^T \hat{\varphi}_1(k))^T W_1^T \hat{\varphi}_1(k)) +$$
$$\alpha_1 \hat{\varphi}_1^T(k)\hat{\varphi}_1(k)(W_1^T \hat{\varphi}_1(k))^T(W_1^T \hat{\varphi}_1(k)) - \chi + \gamma_0^2,$$

where $$\chi = \frac{1}{\alpha_1} \|I - \alpha_1 \hat{\varphi}_1(k)\hat{\varphi}_1^T(k)\|^2 [\Gamma(2 - \Gamma)\|\tilde{W}_1(k)\|^2 - 2\Gamma(1 - \Gamma)W_{1max}\|\tilde{W}_1(k)\|], \quad (4.18)$$

and $$\gamma_0^2 = \frac{\Gamma^2}{\alpha_1} \|I - \alpha_1 \hat{\varphi}_1(k)\hat{\varphi}_1^T(k)\|^2 W_{1max}^2 + 2\Gamma \|I - \alpha_1 \hat{\varphi}_1(k)\hat{\varphi}_1^T(k)\| \|\varphi_{1max}^2 W_{1max}^2 \quad (4.19)$$

Note (4.19) is in power form for discrete-time systems given by (2.11) with g(k) a monic quadratic function of the state. Similarly for the hidden layer, it can be easily shown that the weight update law is in fact a state strict map.

(ii) Algorithm (a): The revised dynamics for the output layer relative to $\tilde{W}_3(k)$ are given by $$\tilde{W}_1(k+1)=[I-\alpha_3\hat{\phi}_3^T(k)]\tilde{W}_3(k)+\alpha_3\hat{\phi}_1(k)(W_3^T\phi_3(k)+\epsilon(k)+d(k))^T+\Gamma\|I-\alpha_3\hat{\phi}_3(k)\hat{\phi}_3^T(k)\|\hat{W}_3(k), \quad (4.20)$$

Select the Lyapunov function candidate (4.4) and use (4.20) in (4.5) to obtain $$\Delta J \leq -(2-\alpha_3\hat{\varphi}_3^T(k)\hat{\varphi}_3(k))\left(-\tilde{W}_3^T(k)\hat{\varphi}_3(k)\right)^T\left(-\tilde{W}_3^T(k)\hat{\varphi}_3(k)\right) + \quad (4.21)$$
$$2[(1-\alpha_3\hat{\varphi}_3^T(k)\hat{\varphi}_3(k))-\Gamma\|I-\alpha_3\hat{\varphi}_3(k)\hat{\varphi}_3^T(k)\|]$$
$$\left(-\tilde{W}_3^T\hat{\varphi}_3(k)\right)^T(W_3^T\tilde{\varphi}_3(k)+\varepsilon(k)+d(k))+\alpha_3\hat{\varphi}_3^T(k)\hat{\varphi}_3(k)$$
$$(W_3^T\tilde{\varphi}_3(k)+\varepsilon(k)+d(k))^T(W_3^T\tilde{\varphi}_3(k)+\varepsilon(k)+d(k))-\chi+\gamma_0^2,$$

where $$\chi = \frac{1}{\alpha_3}\|I-\alpha_3\hat{\varphi}_3(k)\hat{\varphi}_3^T(k)\|^2[\Gamma(2- \quad (4.22)$$
$$\Gamma)\|\tilde{W}_3(k)\|^2-2\Gamma(1-\Gamma)W_{3\max}\|\tilde{W}_3(k)\|],$$

and $$\gamma_0^2 = \frac{\Gamma^2}{\alpha_3}\|I-\alpha_3\hat{\varphi}_3(k)\hat{\varphi}_3^T(k)\|^2 W_{3\max}^2 + 2\Gamma\|I- \quad (4.23)$$
$$\alpha_3\hat{\varphi}_3(k)\hat{\varphi}_3^T(k)\|\|\varphi_{3\max}W_{3\max}(W_{3\max}\tilde{\varphi}_{3\max}+\varepsilon_N+d_M).$$

Note (4.21) is in power form for discrete-time systems given by (2.11) with g(k) a monic quadratic function of the state. Algorithm (b): The revised dynamics for the output layer relative to $\tilde{W}_3(k)$ are given by $$\tilde{W}_1(k+1)=[I-\alpha_3\hat{\phi}_3^T(k)]\tilde{W}_3(k)+\alpha_3\hat{\phi}_1(k)(W_3^T\phi_3(k)+\epsilon(k)+d(k))^T+\Gamma\|I-\alpha_3\hat{\phi}_3(k)\hat{\phi}_3^T(k)\|\hat{W}_3(k), \quad (4.24)$$

Select the Lyapunov function candidate (4.4) and using (4.24) in (4.5) yields $$\Delta J \leq -(2-\alpha_3\hat{\varphi}_3^T(k)\hat{\varphi}_3(k))\left(-\tilde{W}_3^T(k)\hat{\varphi}_3(k)\right)^T\left(-\tilde{W}_3^T(k)\hat{\varphi}_3(k)\right) + \quad (4.25)$$
$$2[(1-\alpha_3\hat{\varphi}_3^T(k)\hat{\varphi}_3(k))-\Gamma\|I-\alpha_3\hat{\varphi}_3(k)\hat{\varphi}_3^T(k)\|]$$
$$\left(-\tilde{W}_3^T\hat{\varphi}_3(k)\right)^T(k_v r(k)+W_3^T\tilde{\varphi}_3(k)+\varepsilon(k)+d(k))+$$
$$\alpha_3\hat{\varphi}_3^T(k)\hat{\varphi}_3(k)(k_v r(k)+W_3^T\tilde{\varphi}_3(k)+\varepsilon(k)+d(k))^T$$
$$(k_v r(k)+W_3^T\tilde{\varphi}_3(k)+\varepsilon(k)+d(k))-\chi+\gamma_0^2,$$

where $\chi$ and $\gamma_0^2$ are given in (4.22) and (4.23) respectively. Note (4.25) is in power form for discrete-time systems given by (2.11).

The next result demonstrates the passivity properties for NN with an arbitrary number of hidden layers.

Corollary 4.4

(i) The modified weight tuning of algorithms (3.82) for the input and hidden layers in a n-layer NN make the maps from $W_i^T$ to $\tilde{W}_i^T(k)$; $\forall i=1,\ldots, n-1$, state strict passive mass.

(ii) The weight tuning mechanisms (3.83) and (3.84) for a n-layer NN make the map from, $(W_n^T\phi_n(k)+\epsilon(k)+d(k))$ for the case of algorithm (a), and $(k_v r(k)+W_n^T\phi_n(k)+\epsilon(k)+d(k))$ for the case of algorithm (b), to $-\tilde{W}_n^T(k)\hat{\phi}_n(k)$ a state strict passive map, Proof:

(i) The revised dynamics relative to input and hidden layers, $-\tilde{W}_i(k)$; $\forall_i=1,\ldots n-1$, error in weight estimates are given by $$\tilde{W}_i(k+1)=[I-\alpha_3\hat{\phi}_3^T(k)]\tilde{W}_3(k)+\alpha_i\hat{\phi}_i(k)(W_3^T\hat{\phi}_3(k)+\epsilon(k)+d(k))^T+\Gamma\|I-\alpha_i\hat{\phi}_i(k)\phi_i^T(k)\|\hat{W}_i(k), \forall i=1,\ldots, n-1. \quad (4.26)$$

Select the Lyapunov function candidate (4.8) and use (4.26) in (4.9) to obtain $$\Delta J \leq -(2-\alpha_i\hat{\varphi}_i^T(k)\hat{\varphi}_i(k))\left(\tilde{W}_i^T(k)\hat{\varphi}_i(k)\right)^T\left(\tilde{W}_i^T(k)\hat{\varphi}_i(k)\right) + \quad (4.27)$$
$$2[(1-\alpha_i\hat{\varphi}_i^T(k)\hat{\varphi}_i(k))-\Gamma\|I-\alpha_i\hat{\varphi}_i(k)\hat{\varphi}_i^T(k)\|]\left(\tilde{W}_i^T(k)\hat{\varphi}_i(k)\right)^T$$
$$(W_i^T\tilde{\varphi}_i(k))+\alpha_i\hat{\varphi}_i^T(k)\hat{\varphi}_i(k)(W_i^T\tilde{\varphi}_i(k))^T(W_i^T\tilde{\varphi}_i(k)) -$$
$$\chi_i+\gamma_{i0}^2, \forall i=1,\ldots,n-1$$

where $$\chi_i = \frac{1}{\alpha_i}\|I-\alpha_i\hat{\varphi}_i(k)\hat{\varphi}_i^T(k)\|^2[\Gamma(2- \quad (4.28)$$
$$\Gamma)\|\tilde{W}_i(k)\|^2-2\Gamma(1-\Gamma)W_{i\max}\|\tilde{W}_i(k)\|],$$

and $$\gamma_{i0}^2 = \frac{\Gamma^2}{\alpha_i}\|I-\alpha_i\hat{\varphi}_i(k)\hat{\varphi}_i^T(k)\|^2 W_{i\max}^2 + 2\Gamma\|I- \quad (4.29)$$
$$\alpha_i\hat{\varphi}_i(k)\hat{\varphi}_i^T(k)\|\|\varphi_{i\max}^2 W_{i\max}^2$$

Note (4.27) is in power form for discrete-time systems given by (2.11) with g(k) a monic quadratic function of the state. Similarly for the hidden layer, it can be easily shown that the weight update law is in fact a state strict map.

(ii) Algorithm (a): The revised dynamics for the output layer relative to $\tilde{W}_n(k)$ are given by Select the Lyapunov function candidate (4.11) and use (4.30) in (4.12) to obtain $$\Delta J \leq -(2-\alpha_n\varphi_n^T(k)\hat{\varphi}_n(k))\left(-\tilde{W}_n^T(k)\hat{\varphi}_n(k)\right)^T\left(-\tilde{W}_n^T(k)\hat{\varphi}_n(k)\right) + \quad (4.31)$$
$$2[(1-\alpha_n\varphi_n^T(k)\hat{\varphi}_n(k))-\Gamma\|I-\alpha_n\hat{\varphi}_n(k)\hat{\varphi}_n^T(k)\|]$$
$$\left(-\tilde{W}_n^T(k)\hat{\varphi}_n(k)\right)^T(W_n^T\tilde{\varphi}_n(k)+\varepsilon(k)+d(k)) +$$
$$\alpha_n\hat{\varphi}_n^T(k)\hat{\varphi}_n(k)(W_n^T\tilde{\varphi}_n(k)+\varepsilon(k)+d(k))^T$$
$$(W_n^T\tilde{\varphi}_n(k)+\varepsilon(k)+d(k))-\chi_n+\gamma_{n0}^2,$$

where $$\chi_n = \frac{1}{\alpha_n}\|I-\alpha_n\hat{\varphi}_n(k)\hat{\varphi}_n^T(k)\|^2[\Gamma(2- \quad (4.32)$$
$$\Gamma)\|\tilde{W}_n(k)\|^2-2\Gamma(1-\Gamma)W_{n\max}\|\tilde{W}_n(k)\|],$$

and $$\gamma_{n0}^2 = \frac{\Gamma^2}{\alpha_n}\|I-\alpha_n\hat{\varphi}_n(k)\hat{\varphi}_n^T(k)\|^2 W_{n\max}^2 + 2\Gamma\|I- \quad (4.33)$$
$$\alpha_n\hat{\varphi}_n(k)\hat{\varphi}_n^T(k)\|\|\varphi_{n\max}W_{n\max}(W_{n\max}\tilde{\varphi}_{n\max}+\varepsilon_N+d_M).$$

Note (4.31) is in power form for discrete-time systems given by (2.12) with g(k) a monic quadratic function of the state. Algorithm (b): The revised dynamics for the output layer relative to $\tilde{W}_n(k)$ are given by $$\tilde{W}_n(k+1)=[I-\alpha_n\hat{\phi}_n^T(k)]\tilde{W}_n(k)+\alpha_n\hat{\phi}_n(k)(W_3^T\hat{\phi}_n(k)+\epsilon(k)+d(k))^T+\Gamma\|I-\alpha_i\hat{\phi}_i(k)\phi_i^T(k)\|\tilde{W}_n(k) \quad (4.34)$$

Select the Lyapunov function candidate (4.11) and using (4.34) in (4.12) yields $$\Delta J \leq -(2-\alpha_n\varphi_n^T(k)\hat{\varphi}_n(k))\left(-\tilde{W}_n^T(k)\hat{\varphi}_n(k)\right)^T\left(-\tilde{W}_n^T(k)\hat{\varphi}_n(k)\right) + \quad (4.35)$$
$$2[(1-\alpha_n\varphi_n^T(k)\hat{\varphi}_n(k))-\Gamma\|I-\alpha_n\hat{\varphi}_n(k)\hat{\varphi}_n^T(k)\|]$$
$$\left(-\tilde{W}_n^T\hat{\varphi}_n(k)\right)^T(k_v r(k)+W_n^T\tilde{\varphi}_n(k)+\varepsilon(k)+d(k))+$$
$$\alpha_n\hat{\varphi}_n^T(k)\hat{\varphi}_n(k)(k_v r(k)+W_n^T\tilde{\varphi}_n(k)+\varepsilon(k)+d(k))^T$$
$$(k_v r(k)+W_n^T\tilde{\varphi}_n(k)+\varepsilon(k)+d(k))-\chi_n+\gamma_{n0}^2$$

where $\chi_n$ and $\gamma_{n02}$ are given in (4.32) and (4.33) respectively. Note (4.35) is in power form for discrete-time systems given by (2.11) with g(k) a monic quadratic function of the state.

It should be noted that SSP of both the system dynamics and the weight tuning block does guarantee SSP of the closed-loop system, so that the norms of the internal states are bounded in terms of the power delivered to each block. Then, boundedness of input/output signals assures state boundedness even without PE.

A NN in defined to be passive if, in the error formulation, it guarantees the passivity of the lower subsystem in FIG. 3. Then, an extra PE condition is needed to guarantee boundedness of the weights. A NN is defined to be robust if, in the error formulation, it guarantees the state strict passivity of the lower subsystem in FIG. 3. Then, no extra PE condition is needed for boundedness of the weights. Note that (1) dissipativity of the error system is needed in addition to tracking stability to guarantee bounded weights, and (2) the NN passivity properties are dependent on the weight tuning algorithm used.

5. SIMULATION RESULTS

In order to illustrate the performance of the NN controller, a continuous-time nonlinear system is considered and the objective is to control this MIMO system by using a digital NN controller. Note that it is extremely difficult to discretize a nonlinear system and therefore to offer stability proofs. The second objective is to demonstrate that the learning rate for the delta rule employed at each layer in fact decreases with an increase in the number of hidden-layer neurons in that layer. Finally, it is shown that the improved weight tuning mechanisms make the NN weights bounded without the need for PE, and can allow fast tuning even for large NN when a projection algorithm is employed in conjunction with the modified weight tuning updates.

Note that the NN controllers derived herein require no a priori knowledge of the dynamics of the nonlinear system, not even the structure of the system being controlled, unlike conventional adaptive control nor is any learning phase needed.

Consider the nonlinear system described by $$X_1 = X_2$$
$$X_2 = F(X_1, X_2) + U, \quad (5.1)$$

where $X_1 = [x_1, x_2]^T$, $X_2 = [x_3, x_4]^T$, $U = [u_1, u_2]^T$ and the nonlinear function is (5.1) is described by $F(X_1, X_2) = [M(X_1)]^{-1} G(X_1, X_2)$, with $$M(X_1) = \begin{bmatrix} (b_1 + b_2)a_1^2 + b_2 a_2^2 + 2 b_2 a_1 a_2 \cos(x_2) & b_2 a_2^2 + b_2 a_1 a_2 \cos(x_2) \\ b_2 a_2^2 + b_2 a_1 a_2 \cos(x_2) & b_2 a_2^2 \end{bmatrix}, \quad (5.2)$$

and $$G(X_1, X_2) = \begin{bmatrix} -b_2 a_1 a_2 (2 x_3 x_4 + x_4^2) \sin(x_2) + 9.8(b_1 + b_2) a_1 \cos(x_1) + 9.8 b_2 a_2 \cos(x_1 + x_2) \\ b_2 a_1 a_2 x_1^2 \sin(x_2) + 9.8 b_2 a_2 \cos(x_1 + x_2) \end{bmatrix}. \quad (5.3)$$

The parameters for the nonlinear system were selected as $a_1 = a_2 = 1$, $b_1 = 2$, and $b_3 = 1$. Desired sinusoidal $$\sin\left(\frac{2\pi t}{25}\right),$$

and Cosine inputs, $$\cos\left(\frac{2\pi t}{25}\right),$$

were preselected for the axis 1 and 2 respectively. The gains of the PD controller were chosen as $k_v = \text{diag}(20, 20)$ with $\Lambda = \text{diag}\{5, 5\}$ and a sampling interval of 10 msec was considered. A three-layer NN was selected with 4 input, 6 hidden and 2 output nodes. Sigmoidal activation functions were employed in all the nodes in the hidden layer. The initial conditions for $X_1$ were chosen to be $[0.5, 0.1]^T$, and the weights were initialized to zero. No learning is performed initially to train the networks. The upper bound on the allowed adaptation gains $\alpha_1$, $\alpha_2$, and $\alpha_3$ using (3.16) for the case of delta rule at each layer is computed to be 0.5, 0.32, and 0.5 respectively.

NN Controller with Delta Rule Weight Tuning and Projection Algorithm

The adaptation gains for the multilayer NN weight tuning are selected as $\alpha_1 = 0.2$, $\alpha_2 = 0.01$, and $\alpha_3 = 0.1$ for the case of the delta rule (3.10) through (3.4) and $\xi_1 = 1.5$ $\xi_2 = 1.5$, and $\xi_3 = 0.7$ with $\zeta_1 = \zeta_2 = \zeta_3 = 0.001$ for the case of the projection algorithm (3.10) through (3.14) with (3.53). FIGS. 4A and 4B and FIGS. 5A and 5B present the tracking responses of the controllers with delta rule and projection algorithm respectively. It is clear that the controller using the delta rule at each layer performs equally well with the projection algorithm when the value of the adaptation gain is small so that (3.16) is satisfied. However, large values of the weights initially were needed not only for the delta rule with small $\alpha_3 = 0.1$ (shown in FIG. 4B), but also for the projection algorithm with large adaptation gains for the case of projection algorithm, overshoots and undershoots are observed in the initial stages even though the tracking performance is extremely impressive.

Figure 6A:
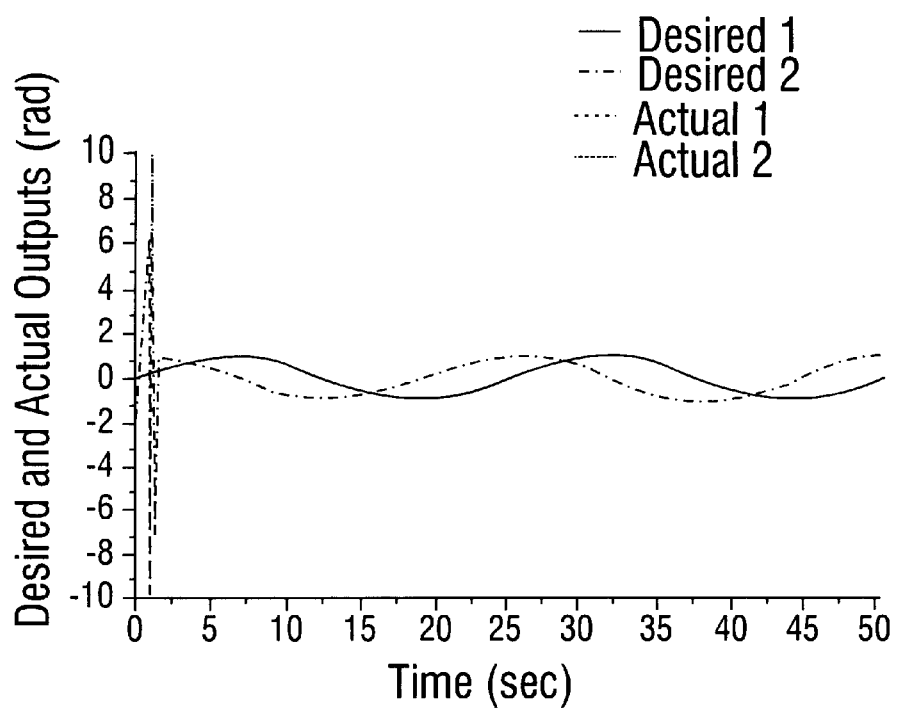
FIGS. 6A and 6B illustrate tracking response of a neural network controller according to the present invention with delta rule.
Figure 6B:
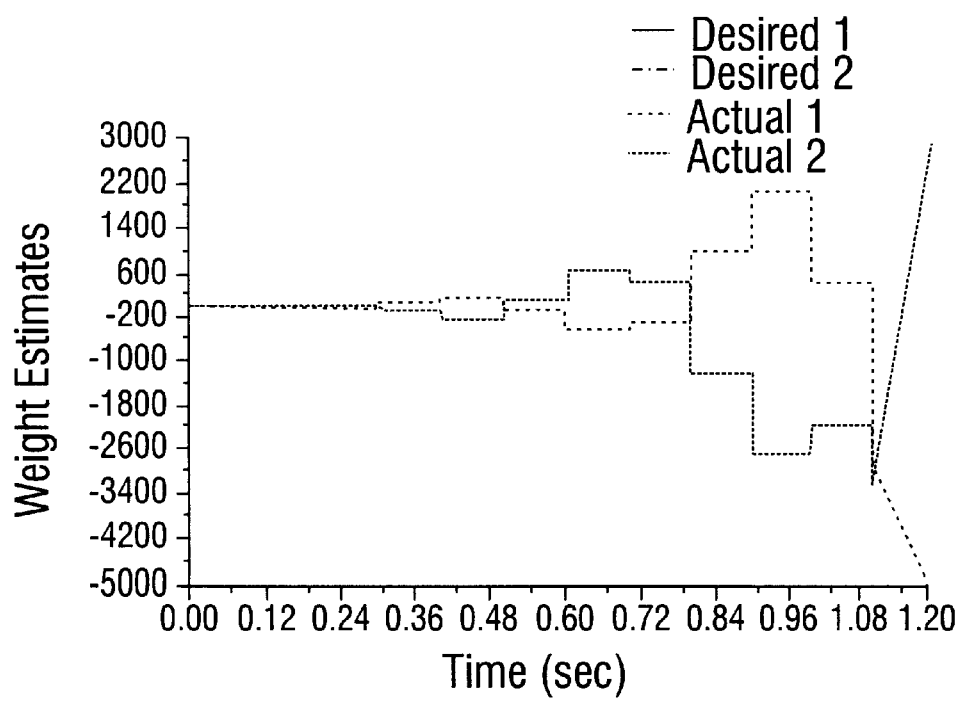

FIG. 6A illustrates the response of the NN controller when the delta rule is employed with the adaptation gain $\alpha_3$ in the last layer changed from 0.1 to 0.51. FIG. 6A, it is evident that the weight tuning using the delta rule at each layer becomes unstable at t=1.08 sec. Note that the representative weight estimates, as illustrated in FIG. 6B, of the NN are unbounded in this case. This demonstrates that the adaptation gain in the case of delta rule at each layer must decrease with an increase in the hidden-layer neurons. In fact, the theoretical limit implied by (3.16) in this case is $\alpha_3=0.51$, so that this bound appears to be a tight bound in general.

Figure 7A:
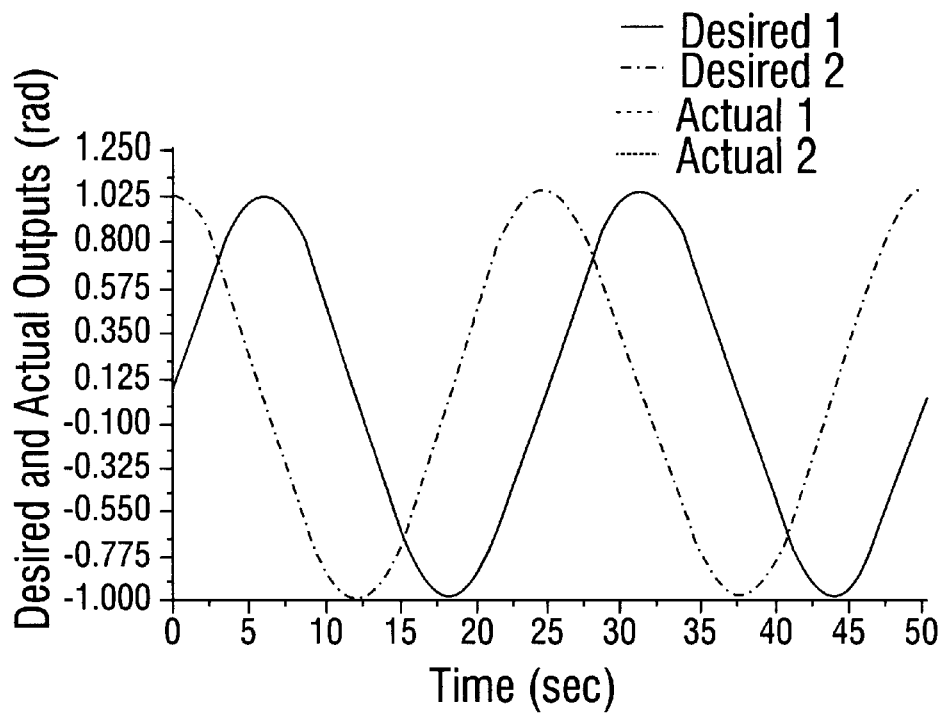
FIGS. 7A and 7B illustrate tracking response of a neural network controller according to the present invention.
Figure 7B:
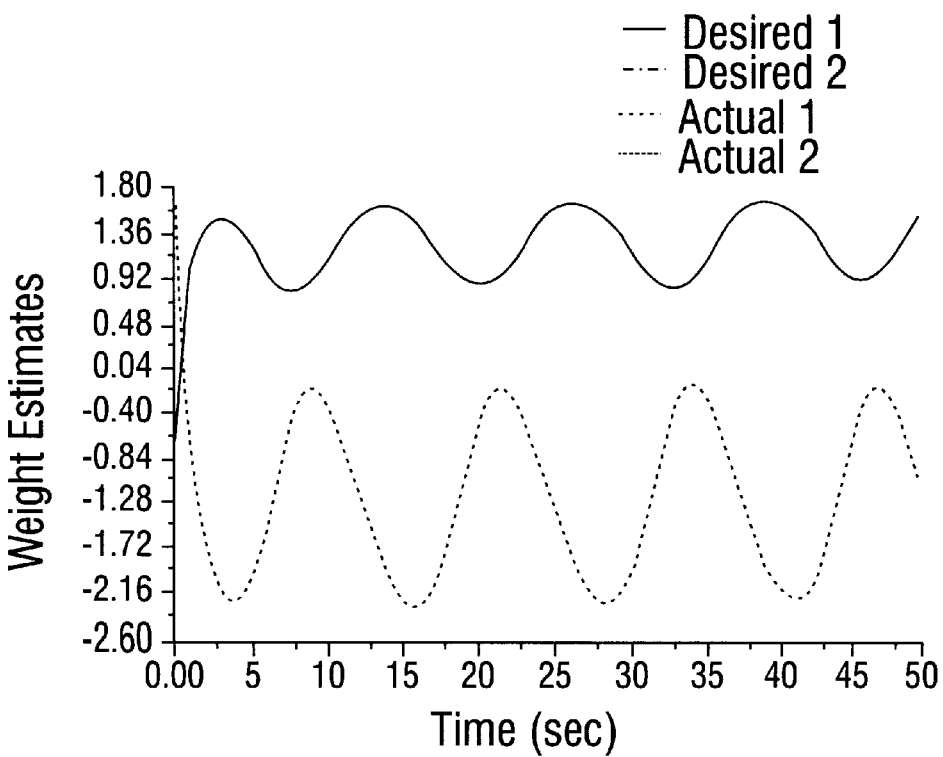

The performance of the NN controller was investigated while varying the adaptation gains at the output layer for the case of projection algorithm. FIG. 7A and FIG. 7B show the tracking response and some NN representative weight estimates of the NN controller with $\xi_1=1.0$, $\xi_2=1.0$, and $\xi_3=0.1$ with $\zeta_1=\zeta_2=\zeta_3=0.001$. As expected, the overshoots and undershoots have been totally eliminated but there appears to be a slight degradation in the performance. In other words at very small adaptation gains, overshoots and undershoots are not seen but there appears a slight degradation in the tracking performance with a slow and smooth convergence. On the other hand, at large adaptation gains overshoots are observed with a good tracking performance. As the adaptation gains are further increased, the oscillatory behavior continue to increase and finally the system becomes unstable. In other words, from the bounds presented in (3.17), as the adaptation gains are increased the margin of stability continues to decrease and at large adaptation gains (i.e. close to 1) the system becomes unstable. Thus, the simulation results conducted corroborate with the bounds presented in the previous sections.

NN Controller with Improved Weight Tuning and Projection Algorithm

Figure 8A:
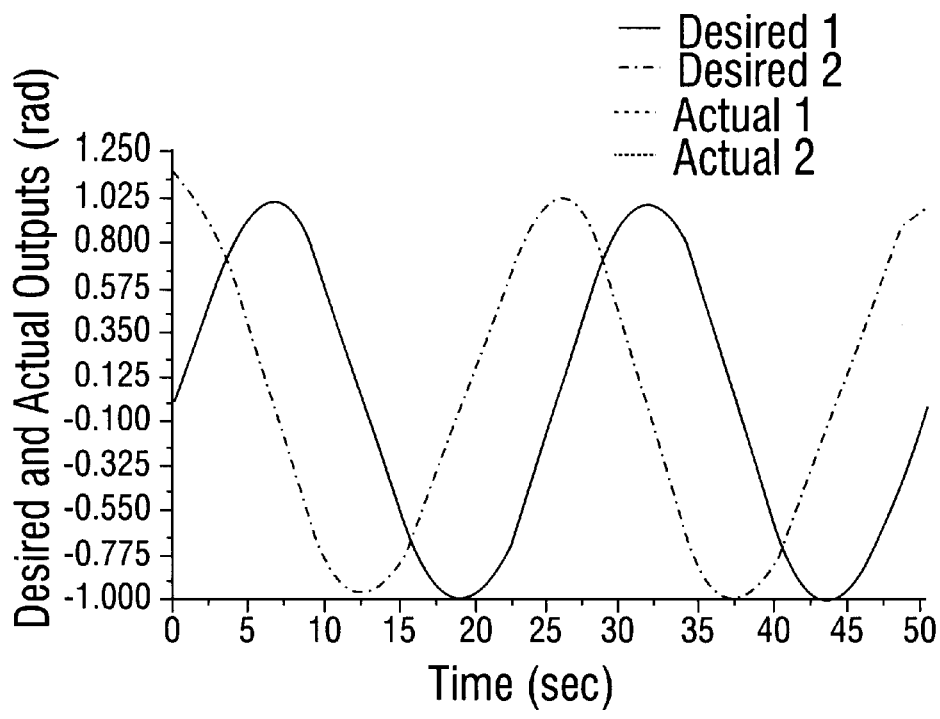
FIGS. 8A and 8B illustrate tracking response of a neural network controller according to the present invention.
Figure 8B:
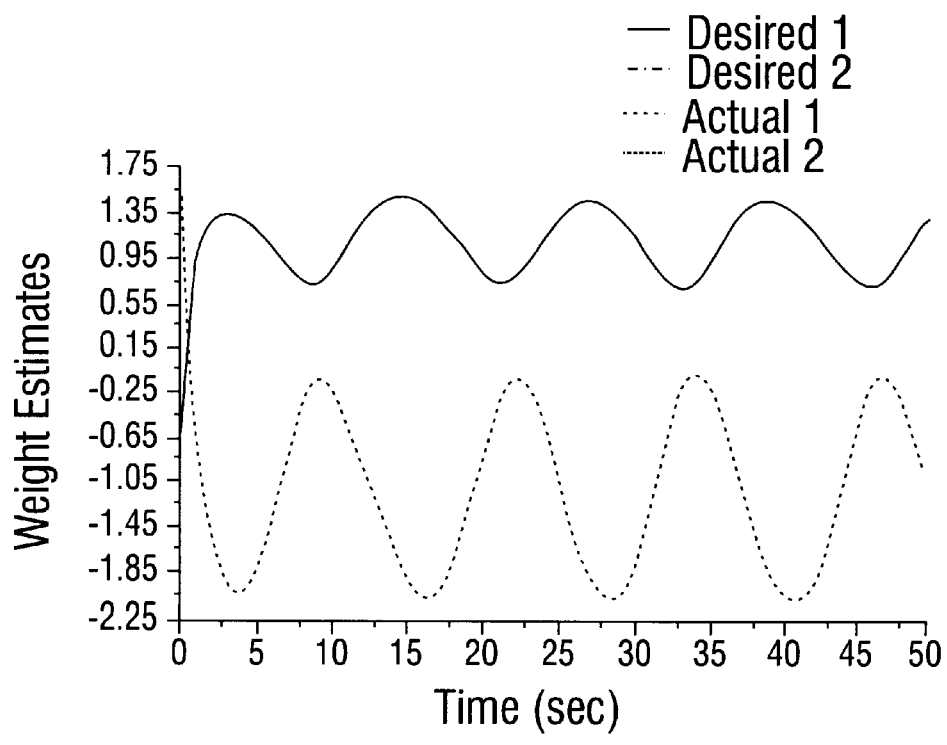

In the case of projection algorithm (3.10) through (3.14) with (3.53), the weights in FIGS. 8A and 8B appear to be bounded, though this in general cannot be guaranteed without the PE condition. Therefore, the response of the controller with the improved weight tuning (3.59) through (3.62) with (3.53) is shown in FIG. 8B. The design parameter $\Gamma$ is selected to be 0.01. Note that with the improved weight tuning, not only the tracking performance is improved, for instance in axis 2, but also the weights remain bounded without the necessity of PE. Finally, in all cases no initial NN training or learning phase was needed. In addition, the dynamics of the nonlinear system was not required to implement the NN controller as opposed to conventional adaptive control.

Figure 9:
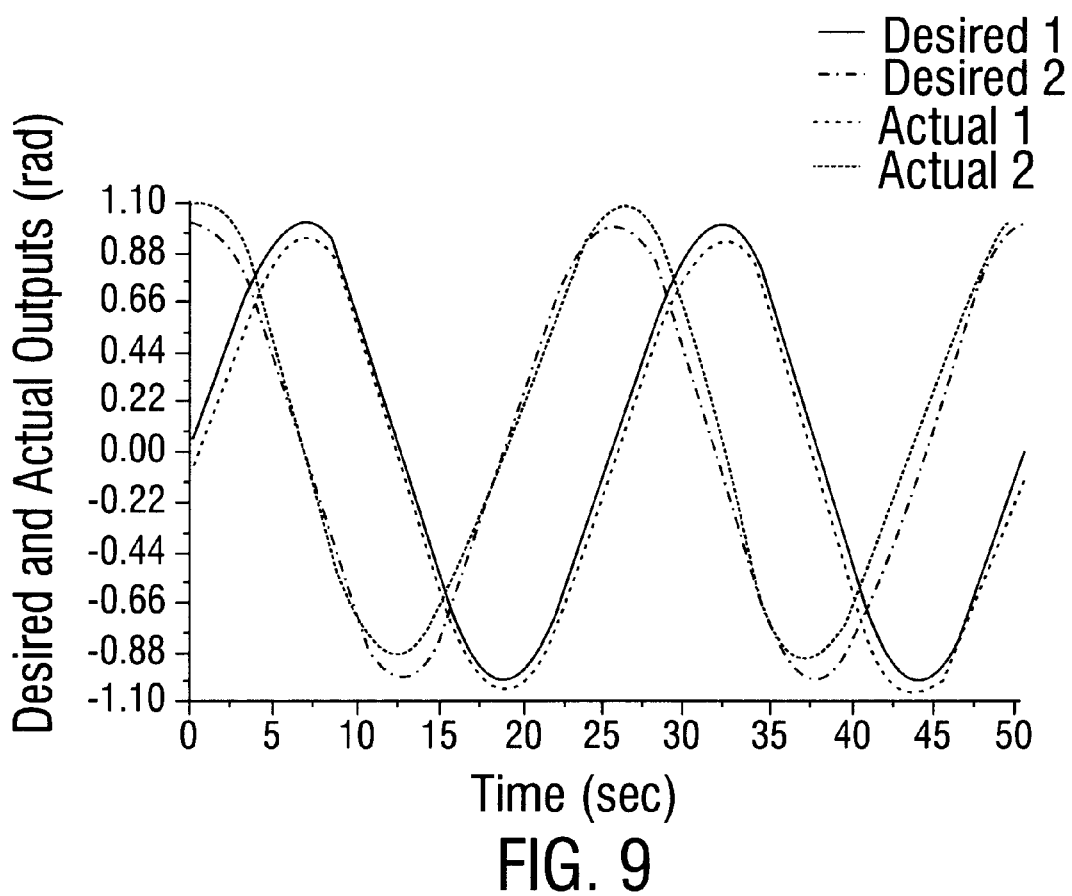
FIG. 9 illustrates the tracking response of a PD controller without a neural network.

To study the contribution of the NN, FIG. 9 shows the response of the PD controller with no neural net. From FIG. 9, it is clear that the addition of the NN makes a significant improvement in the tracking performance.

6. CONCLUSION

A family of multilayer neural net controllers is developed for the control of nonlinear dynamical systems. The NN has a structure derived from passivity/filtered error notions and offers guaranteed performance. Weight updates using the delta rule at each layer were shown to yield a passive NN. Thus, a persistence of excitation condition is needed on the internal signals NN signals. It was found that the adaptation gain in the case of the delta rule at each layer must decrease with an increase in the number of hidden-layer neurons in that layer so that learning must slow down for large NN.

In order to overcome the above deficiencies, a family of improved weight tuning algorithms was derived. The improved weight tuning paradigms consist of the weight updates used in the delta rule at each layer plus a correction term similar to e-modification approach in the case of continuous-time conventional adaptive control. The improved tuning algorithms make the NN state strict passive, so that bounded weights are guaranteed in practical non-ideal situations where PE may not hold. Furthermore, the adaptation gain is modified to obtain a projection algorithm so that the learning rate is independent of the number of hidden-layer neurons. At low adaptation gains, as expected, a smooth and slow convergence was observed with a slight degradation in tracking performance. On the other hand, at large adaptation gains, oscillatory behavior was seen with a good tracking performance and faster convergence. Finally, no NN learning or training phase was needed; simply initializing the NN weights at zero made for fast convergence and bounded errors.

What is claimed is:

1. A method of controlling a plant through on-line tuning of a multi-layer neural network, comprising the steps of:

obtaining data on output characteristics of the plant;

estimating a functional output of the plant from past output of the plant and current values of a plurality of neural network weights and a plurality of neural network layer activation functions;

initializing said neural network weights to give an initial neural network output of zero;

updating said neural network weights to tune said multi-layer network in accordance with weight tuning equations:

$$\hat{W}_1(k+1)=\hat{W}_1(k)-\alpha_1\hat{\phi}_1(k)\hat{y}_1^T(k)-\Gamma\|I-\alpha_1\hat{\phi}_1(k)\hat{\phi}_1^T(k)\|\hat{W}_1(k),$$

and $$\hat{W}_2(k+1)=\hat{W}_2(k)-\alpha_2\hat{\phi}_2(k)\hat{y}_2^T(k)-\Gamma\|I-\alpha_2\hat{\phi}_2(k)\hat{\phi}_2^T(k)\|\hat{W}_2(k),$$

and in accordance with one of the modified weight update equations:

a) $\hat{W}_3(k+1)=\hat{W}_3(k)-\alpha_3\hat{\phi}_3(k)\hat{f}^{-T}(k)-\Gamma\|I-\alpha_3\hat{\phi}_3(k)\hat{\phi}_3^T(k)\|\hat{W}_3(k),$ b) $\hat{W}_3(k+1)=\hat{W}_3(k)-\alpha_3\hat{\phi}_3(k)r^T(k)-\Gamma\|I-\alpha_3\hat{\phi}_3(k)\hat{\phi}_3^T(k)\|\hat{W}_3(k),;$ obtaining an error function from past and present output of the plant and a desired output of said plant;

determining a response function to control future output of the plant;

outputting said response function to the plant; and controlling the plant using said response function.

2. A method as claimed in claim 1, wherein said updating step further comprises conditions:

(1) $\alpha_i\varphi_{i\max}^2 < 2, \forall\, i = 1, 2,$ $< 1, i = 3,$ (2) $0 < \Gamma < 1,$ and (3) $k_{v\max} < \dfrac{1}{\sqrt{\eta}}$ for weight update equation (a), and $k_{v\max} < \dfrac{1}{\sqrt{\sigma}}$ for weight update equation (b), where $\eta$ is $$\eta = 1 + \frac{1}{(1-\alpha_3\varphi_{3\max}^2)},$$

for weight update equation (a) and $\sigma$ for weight update equation (b) is:

$$\sigma = \frac{1}{\eta}\left[1 + \Gamma^2\|I-\alpha_3\hat{\varphi}_3(k)\hat{\varphi}_3^T(k)\|^2 + 2\alpha_3\Gamma\hat{\varphi}_{3\max}^2\|I-\alpha_3\hat{\varphi}_3(k)\hat{\varphi}_3^T(k)\|\right].$$

with $\eta$ being $$\eta = \frac{1}{(1-\alpha_3\varphi_{3\max}^2)}.$$

3. A method for direct adaptive control of a nonlinear plant having a sensed state x and an output trajectory, said sensed state evolving via an unknown function f(x), using a discrete-time neural network controller, comprising the steps of:

obtaining data on past and present states of the plant;

estimating said unknown function f(x) from past and present values of the past and present states of the plant and current values of a plurality of neural network weights and a plurality of neural network activation functions;

comparing said sensed state with a desired state from a desired trajectory in an outer feedback loop to produce a tracking error signal;

calculating a control action as a function of said tracking error signal and said functional estimate;

applying said control action to said plant to drive said output trajectory toward said desired trajectory; and adjusting said plurality of neural network weights such that said discrete-time neural network controller guarantees tracking stability and bounded weights.

4. The method of claim 3, wherein said calculating step comprises extending standard delta rule technique to said tracking error signal, thereby providing guaranteed closed-loop stability without preliminary off-line training of said plurality of neural network weights.

5. The method of claim 3, wherein said discrete-time neural network comprises a passivity property, thereby guaranteeing robust performance of said discrete-time neural network controller.

6. A method of controlling future output of a plant via a neural network, comprising the steps of:

obtaining actual and desired output characteristics of the plant;

using said neural network to obtain modeled functional behavior of said actual output characteristics of said plant using a plurality of neural network weights and activation functions;

initializing said neural network weights to give an initial neural network output of zero;

updating said neural network weights to tune said multilayer network in accordance with weight tuning equations:

$$\hat{W}_1(k+1)=\hat{W}_1(k)-\alpha_1\hat{\phi}_1(k)\hat{y}_1^T(k)-\Gamma\|I-\alpha_1\hat{\phi}_1(k)\hat{\phi}_1^T(k)\|\hat{W}_1(k),$$

and $$\hat{W}_2(k+1)=\hat{W}_2(k)-\alpha_2\hat{\phi}_2(k)\hat{y}_2^T(k)-\Gamma\|I-\alpha_2\hat{\phi}_2(k)\hat{\phi}_2^T(k)\|\hat{W}_2(k),$$

and in accordance with one of the modified weight update equations:

a) $\hat{W}_3(k+1)=\hat{W}_3(k)-\alpha_3\hat{\phi}_3(k)\hat{f}^{-T}(k)-\Gamma\|I-\alpha_3\hat{\phi}_3(k)\hat{\phi}_3^T(k)\|\hat{W}_3(k),$ b) $\hat{W}_3(k+1)=\hat{W}_3(k)-\alpha_3\hat{\phi}_3(k)r^T(k)-\Gamma\|I-\alpha_3\hat{\phi}_3(k)\hat{\phi}_3^T(k)\|\hat{W}_3(k),;$ constructing a control signal from said actual output characteristics, said modeled functional behavior, and said desired output characteristics, and controlling said future output of the plant using the control signal.

* * * * *

UNITED STATES PATENT AND TRADEMARK OFFICE
CERTIFICATE OF CORRECTION

PATENT NO.  : 6,064,997
DATED       : May 16, 2000
INVENTOR(S) : Jagannathan et al.

It is certified that error appears in the above-identified patent and that said Letters Patent is hereby corrected as shown below:

In Column 38, line 41, please delete equation b) and replace with the following equation:

-- b) $\hat{W}_3(k+1) = \hat{W}_3(k) - \alpha_3 \hat{\phi}_3(k) r^T(k+1) - \Gamma \| I - \alpha_3 \hat{\phi}_3(k) \hat{\phi}_3^T(k) \| \hat{W}_3(k),$ --

In Column 40, line 1, please delete "technique" and insert therefor -- techniques --.

In Column 40, line 34, please delete equation b) and replace with the following equation:

-- b) $\hat{W}_3(k+1) = \hat{W}_3(k) - \alpha_3 \hat{\phi}_3(k) r^T(k+1) - \Gamma \| I - \alpha_3 \hat{\phi}_3(k) \hat{\phi}_3^T(k) \| \hat{W}_3(k),$ --

Signed and Sealed this

Tenth Day of April, 2001

Attest:

NICHOLAS P. GODICI

Attesting Officer        *Acting Director of the United States Patent and Trademark Office*